(12) United States Patent
Nomizu

(10) Patent No.: US 7,411,694 B2
(45) Date of Patent: Aug. 12, 2008

(54) DATA CONVERSION APPARATUS FOR AND METHOD OF DATA CONVERSION FOR IMAGE PROCESSING

(75) Inventor: Yasuyuki Nomizu, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 1072 days.

(21) Appl. No.: 10/348,444

(22) Filed: Jan. 21, 2003

(65) Prior Publication Data
US 2003/0137695 A1 Jul. 24, 2003

(30) Foreign Application Priority Data
Jan. 21, 2002 (JP) .............................. 2002-011590

(51) Int. Cl.
*H04N 1/40* (2006.01)
(52) U.S. Cl. .................... 358/1.16; 358/1.17
(58) Field of Classification Search ....... 358/1.15–1.17, 358/1.9, 2.1, 523–524, 404, 444
See application file for complete search history.

(56) References Cited

U.S. PATENT DOCUMENTS

| 5,649,146 A | * | 7/1997 | Riou | 711/217 |
| 6,996,326 B2 | * | 2/2006 | Koshino et al. | 386/47 |
| 2005/0270842 A1 | * | 12/2005 | Furuta et al. | 365/185.09 |

* cited by examiner

*Primary Examiner*—Thomas Lee
*Assistant Examiner*—Stephen Brinich
(74) *Attorney, Agent, or Firm*—Knoble Yoshida & Dunleavy, LLC.

(57) ABSTRACT

The efficient use of memory devices is crucial in processing a large amount of data. In particular, the buffer memory is used in an efficient manner by the use of a buffer memory control unit. The efficient use of the buffer memory is implemented in a high-speed color data processing unit in a color image processing device such as copiers, facsimile devices and printers.

24 Claims, 25 Drawing Sheets

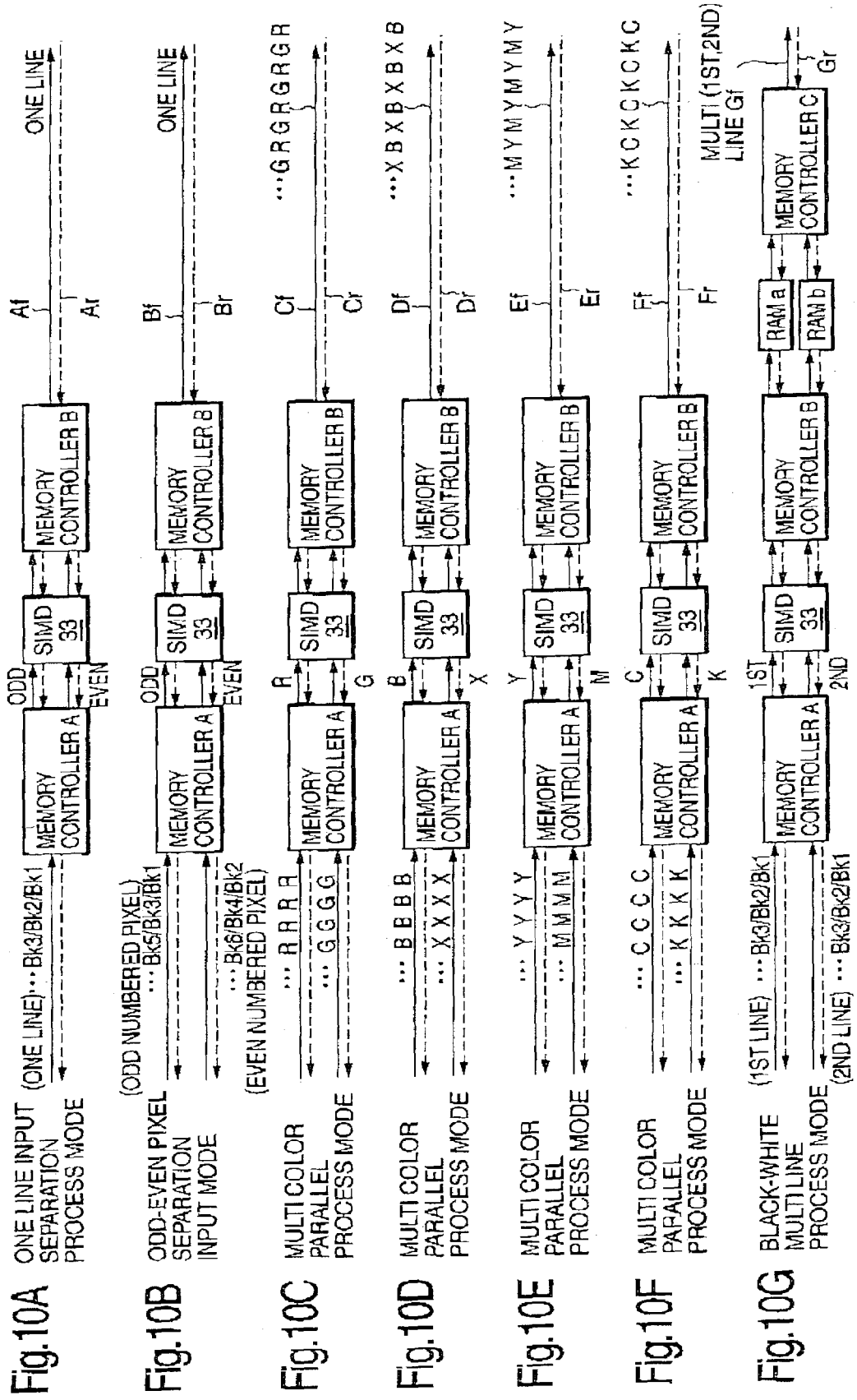

Fig.16A
MEMORY CONTROLLER SETTING REGISTER

| MEMORY CONTROLLER 0 SETTING INFORMATION |
|---|
| MEMORY CONTROLLER 1 SETTING INFORMATION |
| MEMORY CONTROLLER 2 SETTING INFORMATION |
| ⋮ |
| MEMORY CONTROLLER 17 SETTING INFORMATION |
| MEMORY CONTROLLER 18 SETTING INFORMATION |
| MEMORY CONTROLLER 19 SETTING INFORMATION |

Fig.16B
MEMORY CONTROLLER i SETTING INFORMATION (i=0~19)

```
TRANSFER MODE :
         FROM :
           TO :
CONTROL MODE :
```

Fig.16C
BUFFER MEMORY MANAGEMENT REGISTER

| BUFFER MEMORY 0 MANAGEMENT INFORMATION |
|---|
| BUFFER MEMORY 1 MANAGEMENT INFORMATION |
| BUFFER MEMORY 2 MANAGEMENT INFORMATION |
| ⋮ |
| BUFFER MEMORY 15 MANAGEMENT INFORMATION |
| BUFFER MEMORY 16 MANAGEMENT INFORMATION |
| BUFFER MEMORY 17 MANAGEMENT INFORMATION |

Fig.16D
BUFFER MEMORY j MANAGEMENT INFORMATION (j=0~17)

```
START ADDRESS :
  END ADDRESS :
      USE MODE : (BUFFER/LUT)
START ADDRESS :
  END ADDRESS :
      USE MODE : (BUFFER/LUT)
```

Fig.17A RAM No.i 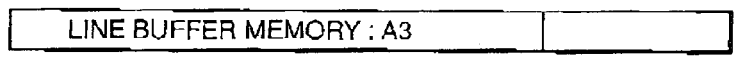
Fig.17B RAM No.j 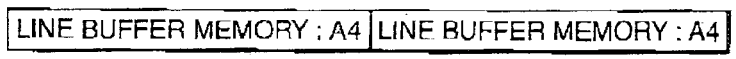
Fig.17C RAM No.k 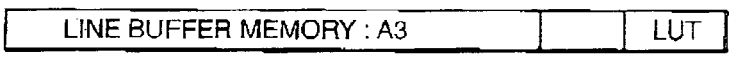
Fig.17D RAM No.l 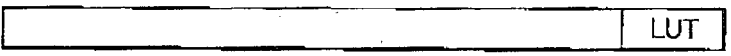
Fig.17E RAM No.m 
Fig.17F RAM No.n 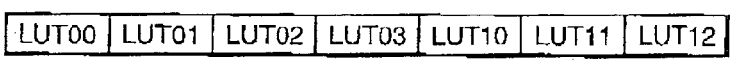

Fig.18

| HDD | | |
|---|---|---|
| | PROGRAM CODE(No.) | PROGRAM CONTENT |
| | ⋮ | ⋮ |
| SCANNER γ CONVERSION PROGRAM GROUP | S1R | SCANNER γ CONVERSION No.1 R CONVERSION PROGRAM |
| | S1G | SCANNER γ CONVERSION No.1 G CONVERSION PROGRAM |
| | S1B | SCANNER γ CONVERSION No.1 B CONVERSION PROGRAM |
| | S2R | SCANNER γ CONVERSION No.2 R CONVERSION PROGRAM |
| | S2G | SCANNER γ CONVERSION No.2 G CONVERSION PROGRAM |
| | S2B | SCANNER γ CONVERSION No.2 B CONVERSION PROGRAM |
| | S3R | SCANNER γ CONVERSION No.3 R CONVERSION PROGRAM |
| | S3G | SCANNER γ CONVERSION No.3 G CONVERSION PROGRAM |
| | S3B | SCANNER γ CONVERSION No.3 B CONVERSION PROGRAM |
| | ⋮ | ⋮ |
| | S12R | SCANNER γ CONVERSION No.12 R CONVERSION PROGRAM |
| | S12G | SCANNER γ CONVERSION No.12 G CONVERSION PROGRAM |
| | S12B | SCANNER γ CONVERSION No.12 B CONVERSION PROGRAM |
| PRINTER γ CONVERSION PROGRAM GROUP | P1M | PRINTER γ CONVERSION No.1 M CONVERSION PROGRAM |
| | P1C | PRINTER γ CONVERSION No.1 C CONVERSION PROGRAM |
| | P1Y | PRINTER γ CONVERSION No.1 Y CONVERSION PROGRAM |
| | P1K | PRINTER γ CONVERSION No.1 K CONVERSION PROGRAM |
| | P2M | PRINTER γ CONVERSION No.2 M CONVERSION PROGRAM |
| | P2C | PRINTER γ CONVERSION No.2 C CONVERSION PROGRAM |
| | P2Y | PRINTER γ CONVERSION No.2 Y CONVERSION PROGRAM |
| | P2K | PRINTER γ CONVERSION No.2 K CONVERSION PROGRAM |
| | P3M | PRINTER γ CONVERSION No.3 M CONVERSION PROGRAM |
| | P3C | PRINTER γ CONVERSION No.3 C CONVERSION PROGRAM |
| | P3Y | PRINTER γ CONVERSION No.3 Y CONVERSION PROGRAM |
| | P3K | PRINTER γ CONVERSION No.3 K CONVERSION PROGRAM |
| | ⋮ | ⋮ |
| | P30M | PRINTER γ CONVERSION No.30 M CONVERSION PROGRAM |
| | P30C | PRINTER γ CONVERSION No.30 C CONVERSION PROGRAM |
| | P30Y | PRINTER γ CONVERSION No.30 Y CONVERSION PROGRAM |
| | P30K | PRINTER γ CONVERSION No.30 K CONVERSION PROGRAM |
| | ⋮ | ⋮ |

Fig.23

| | HDD | |
|---|---|---|
| PROCESS CODE | ADDRESS | DATA CONTENT |
| ⋮ | ⋮ | ⋮ |
| XXX1 (SCANNER γ CONVERSION) | S00 | SCANNER γ CONVERSION PROGRAM |
| | S1R | No.1 R CONVERSION(BOUNDARY VALUE, PARAMETER)GROUP |
| | S1G | No.1 G CONVERSION(BOUNDARY VALUE, PARAMETER)GROUP |
| | S1B | No.1 B CONVERSION(BOUNDARY VALUE, PARAMETER)GROUP |
| | S2R | No.2 R CONVERSION(BOUNDARY VALUE, PARAMETER)GROUP |
| | S2G | No.2 G CONVERSION(BOUNDARY VALUE, PARAMETER)GROUP |
| | S2B | No.2 B CONVERSION(BOUNDARY VALUE, PARAMETER)GROUP |
| | S3R | No.3 R CONVERSION(BOUNDARY VALUE, PARAMETER)GROUP |
| | S3G | No.3 G CONVERSION(BOUNDARY VALUE, PARAMETER)GROUP |
| | S3B | No.3 B CONVERSION(BOUNDARY VALUE, PARAMETER)GROUP |
| | ⋮ | ⋮ |
| | S12R | No.12 R CONVERSION(BOUNDARY VALUE, PARAMETER)GROUP |
| | S12G | No.12 G CONVERSION(BOUNDARY VALUE, PARAMETER)GROUP |
| | S12B | No.12 B CONVERSION(BOUNDARY VALUE, PARAMETER)GROUP |
| XXX2 (PRINTER γ CONVERSION) | P00 | PRINTER γ CONVERSION PROGRAM |
| | P1M | No.1 M CONVERSION(BOUNDARY VALUE, PARAMETER)GROUP |
| | P1C | No.1 C CONVERSION(BOUNDARY VALUE, PARAMETER)GROUP |
| | P1Y | No.1 Y CONVERSION(BOUNDARY VALUE, PARAMETER)GROUP |
| | P1K | No.1 K CONVERSION(BOUNDARY VALUE, PARAMETER)GROUP |
| | P2M | No.2 M CONVERSION(BOUNDARY VALUE, PARAMETER)GROUP |
| | P2C | No.2 C CONVERSION(BOUNDARY VALUE, PARAMETER)GROUP |
| | P2Y | No.2 Y CONVERSION(BOUNDARY VALUE, PARAMETER)GROUP |
| | P2K | No.2 K CONVERSION(BOUNDARY VALUE, PARAMETER)GROUP |
| | P3M | No.3 M CONVERSION(BOUNDARY VALUE, PARAMETER)GROUP |
| | P3C | No.3 C CONVERSION(BOUNDARY VALUE, PARAMETER)GROUP |
| | P3Y | No.3 Y CONVERSION(BOUNDARY VALUE, PARAMETER)GROUP |
| | P3K | No.3 K CONVERSION(BOUNDARY VALUE, PARAMETER)GROUP |
| | ⋮ | ⋮ |
| | P30M | No.30 M CONVERSION(BOUNDARY VALUE, PARAMETER)GROUP |
| | P30C | No.30 C CONVERSION(BOUNDARY VALUE, PARAMETER)GROUP |
| | P30Y | No.30 Y CONVERSION(BOUNDARY VALUE, PARAMETER)GROUP |
| | P30K | No.30 K CONVERSION(BOUNDARY VALUE, PARAMETER)GROUP |
| ⋮ | ⋮ | ⋮ |

Fig.24

DATA RAM 37

| ADDRESS | DATA | REMARKS | |
|---------|------|---------|---|
| 0000H | a1 | 1ST DIVISION | (INCLINE) |
| 0001H | b1 | 1ST DIVISION | (OFFSET) |
| 0002H | a2 | 2ND DIVISION | (INCLINE) |
| 0003H | b2 | 2ND DIVISION | (OFFSET) |
| 0004H | a3 | 3RD DIVISION | (INCLINE) |
| 0005H | b3 | 3RD DIVISION | (OFFSET) |
| 0006H | a4 | 4TH DIVISION | (INCLINE) |
| 0007H | b4 | 4TH DIVISION | (OFFSET) |
| 0008H | a5 | 5TH DIVISION | (INCLINE) |
| 0009H | b5 | 5TH DIVISION | (OFFSET) |
| 000AH | a6 | 6TH DIVISION | (INCLINE) |
| 000BH | b6 | 6TH DIVISION | (OFFSET) |
| 000CH | a7 | 7TH DIVISION | (INCLINE) |
| 000DH | b7 | 7TH DIVISION | (OFFSET) |
| 000EH | a8 | 8TH DIVISION | (INCLINE) |
| 000FH | b8 | 8TH DIVISION | (OFFSET) |

Fig.25

| | HDD | |
|---|---|---|
| PROCESS CODE | ADDRESS | DATA CONTENT |
| ⋮ | ⋮ | ⋮ |
| XXX1 (SCANNER γ CONVERSION) | S00 | SCANNER γ CONVERSION PROGRAM |
| | S1R | No.1 R γ CONVERSION TABLE |
| | S1G | No.1 G γ CONVERSION TABLE |
| | S1B | No.1 B γ CONVERSION TABLE |
| | S2R | No.2 R γ CONVERSION TABLE |
| | S2G | No.2 G γ CONVERSION TABLE |
| | S2B | No.2 B γ CONVERSION TABLE |
| | S3R | No.3 R γ CONVERSION TABLE |
| | S3G | No.3 G γ CONVERSION TABLE |
| | S3B | No.3 B γ CONVERSION TABLE |
| | ⋮ | ⋮ |
| | S12R | No.12 R γ CONVERSION TABLE |
| | S12G | No.12 G γ CONVERSION TABLE |
| | S12B | No.12 B γ CONVERSION TABLE |
| XXX2 (PRINTER γ CONVERSION) | P00 | PRINTER γ CONVERSION PROGRAM |
| | P1M | No.1 M γ CONVERSION TABLE |
| | P1C | No.1 C γ CONVERSION TABLE |
| | P1Y | No.1 Y γ CONVERSION TABLE |
| | P1K | No.1 K γ CONVERSION TABLE |
| | P2M | No.2 M γ CONVERSION TABLE |
| | P2C | No.2 C γ CONVERSION TABLE |
| | P2Y | No.2 Y γ CONVERSION TABLE |
| | P2K | No.2 K γ CONVERSION TABLE |
| | P3M | No.3 M γ CONVERSION TABLE |
| | P3C | No.3 C γ CONVERSION TABLE |
| | P3Y | No.3 Y γ CONVERSION TABLE |
| | P3K | No.3 K γ CONVERSION TABLE |
| | ⋮ | ⋮ |
| | P30M | No.30 M γ CONVERSION TABLE |
| | P30C | No.30 C γ CONVERSION TABLE |
| | P30Y | No.30 Y γ CONVERSION TABLE |
| | P30K | No.30 K γ CONVERSION TABLE |
| ⋮ | ⋮ | ⋮ |

DATA CONVERSION APPARATUS FOR AND METHOD OF DATA CONVERSION FOR IMAGE PROCESSING

FIELD OF THE INVENTION

The current invention is generally related to data conversion in image processing, and more particularly related to an efficient use of buffer memory in high-speed color image data processing.

BACKGROUND OF THE INVENTION

As the computer processing increases in its speed and capacity, the amount of data also increases, and data conversion and data correction are also more frequently used. For example, a scanning correction corrects or repairs RGB data of an original document that is scanned by a scanner. The scanning correction includes CCD between-line correction, a main scanning register adjustment, shading correction, dot correction, vertical stripe correction and γ correction. Another example is an area separation where an edge or inside of binary lines and characters are determined. The area separation also separates dot image such as photographs. Lastly, the area separation separates chromatic elements from achromatic elements. Yet another example is for converting the corrected RGB data into a mapped data set such as CMYK image data and includes intermediate processes such as filtering, background removal, color mapping such as mapping to CMYK image data, color removal, main scanning sizing, main scanning shift, main scanning mirroring, sub scanning sampling, masking and digitization for monochromatic output. Another example is output correction for correcting the processed CMYK image data to match the printer output characteristics. The output correction includes printer γ correction and gradation process. The gradation process includes various processes such as intensity conversion, dithering and error diffusion.

The data processing includes sum of product for filtering, pattern matching for area separations, data conversion based upon a look up table (LUT) such as γ conversion and correction such as shading correction. When a preceding image data process and a proceeding image data process differ in a processing speed, it is necessary to temporarily store the data in a buffer. For filtering and pattern matching processes, since it is necessary to concurrently refer to multiple lines of pixel matrix of image data, the line buffer memory should have a capacity for a number of lines. For this reason, a buffer memory is generally used in image processing.

Japanese Patent Publication Hei 8-305329 discloses a signal process device in which an input data selector is sequentially connected to an input data latch, a memory unit, an output data latch and an output data select according to data flow. Furthermore, the device further includes a write address selector, a read address selector and a central processing unit (CPU) for controlling the selectors. The CPU selects a selector that specifies the memory for use as line memory for receiving TV image reception signal or for use as a look-up table for non-linear calculation. The CPU writes data for the look-up table in the memory unit.

As described above, for color image processing and adjustments, there are numerous data conversions and data corrections. For each of these processes, a necessary memory capacity and data processed amount often differ based upon a kind of data processing and data content. When a single memory resource accommodates the total memory need for the various processes, since memory is multiplexed depending upon the desired timing for the use of the memory in a sequential process flow, it is important to utilize the limited memory resource in an efficient manner. For color image processing, since the data amount is larger than that of chromatic image processing, the processing speed is essential. For this reason, the control of the memory resource is also an important issue. For example, in image formation devices such as a digital copier and a multifunctional machine, even if a processor is dedicated to various images processing, since the color image generally requires certain color specific processes and increases the amount of process data, the processing speed is reduced. In particular, in color image reading devices such as color scanners and color image forming devices such as color printers, the processing capacity for a color γ correction is a significant issue. For example, for the conversion of the RGB image data, at least three look-up tables are needed for each of the RGB data elements. Similarly, for the γ conversion of the YMCK image data, at least four look-up tables are needed for each of the YMCK data elements. The γ conversion takes time for the use of these look-up tables.

The data processing by the signal processing device as disclosed in Japanese Patent Publication Hei 8-305329 includes the line data insertion by the selection control from the output data selector as specified by the CPU during the line memory utilization mode and the data conversion based upon a look-up table during the look-up table utilization mode. It remains desirable to apply the disclosed signal processing device in order to speed up the above data conversion. A first objective of the current invention is to utilize the buffer memory in an efficient manner. A second objective is to implement the high-speed color data processing in a color image processing device.

SUMMARY OF THE INVENTION

In order to solve the above and other problems, according to a first aspect of the current invention, a data conversion apparatus, including: a data processing unit for processing a predetermined number of pieces of data in parallel, each of the data having a predetermined number of bits; a buffer memory unit connected to the data processing unit having memory areas for storing the data from an external of the data conversion apparatus and for inputting the stored data in the predetermined number of the bits and the pieces to the data processing unit in parallel; a control information memory unit for storing control information data specifying non-buffer functions and use areas of the memory areas in the buffer memory unit; and a buffer controller unit connected to the data processing unit, the buffer memory unit and the control information memory unit for defining the use areas for the non-buffer functions in the buffer memory unit based upon the control information data and for establishing a data transfer line between the buffer memory unit and the data processing unit so that each of the use areas of the non-buffer functions has parallel inputs from and outputs to the data processing unit.

According to a second aspect of the current invention, an data conversion apparatus, including: a data processing unit for processing a predetermined number of pieces of data in parallel, each of the data having a predetermined number of bits; a buffer memory unit connected to the data processing unit having memory areas for storing the data from an external of the data conversion apparatus and for inputting the stored data in the predetermined number of the bits and the pieces to the data processing unit in parallel; a control information memory unit for storing control information data specifying non-buffer functions and use areas of the memory areas in the buffer memory unit; and a buffer controller unit connected to the data processing unit, the buffer memory unit and the control information memory unit for defining the use areas for the non-buffer functions in the buffer memory unit based upon the control information data and for establishing a data transfer line between the buffer memory unit and the data processing unit so that each of the use areas of the non-buffer functions has parallel inputs from and outputs to the data processing unit.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 10A is an image data flow as indicated by an arrow and a solid line Af is for "one line input separation mode."

FIG. 10B is an image data flow as indicated by an arrow and a solid line Bf is for "odd-even pixel separation input mode."

FIG. 10C is an image data flow as indicated by an arrow and a solid line Cf is for "multi color concurrent process mode."

FIG. 10D is an image data flow as indicated by an arrow and a solid line Df or Dr corresponds the data flow as indicated by the direction Cf and Cr as described with respect to FIG. 10C.

FIGS. 10E and 10F are image data flows as indicated by an arrow and a solid line Ef or Ff is for "multi color concurrent process mode."

FIG. 10G is an image data flow as indicated by an arrow and a solid line Cf is for "black-and-white multiple line process mode."

FIG. 16A is a diagram illustrating exemplary memory allocation for the memory controller setting information in a memory controller setting register to be used in the current invention.

FIG. 16B is illustrating one major item of the memory controller setting information in the memory controller setting register.

FIG. 16C is illustrating exemplary memory allocation for buffer memory management to be used in the current invention.

FIG. 16D illustrates the area and function specifications of each memory RAM (data buffer/LUT).

FIG. 17A is illustrating a data read write area in one of the RAMs 0 through 17 when the one RAM is used as a line buffer for one line of image data for a short side of the A3 size output image.

FIG. 17B is illustrating a two-line buffer for one line of image data for a short side of the A4 size output. FIG. 17C illustrates a one-line buffer for the A3 size output and a LUT.

FIG. 17C is illustrating a one-line buffer for the A3 size output and a LUT.

FIG. 17D is illustrating a single LUT.

FIG. 17E is illustrating seven LUTs.

FIG. 17F is illustrating LUTs read from the HDD or the LUTs generated by the SIMD-type processors 33 in a part of the RAMs 0 through 17 that is used as a temporary storage.

FIG. 18 is the storage address S1R, S1G and S1B in the first group.

FIG. 23 is written at the γ conversion data storage area in the data RAM 37 of the SIMD-type processor 33.

FIG. 24 is a table illustrating an exemplary set of parameter information in the data RAM 37 to be used in one preferred embodiment of the current invention. One set includes three groups for the R, G and B color component, and each group further includes addresses S1R, S1G and S1B.

FIG. 25 is a table illustrating some exemplary content of a data RAM to be used in the preferred embodiments according to the current invention.

DETAILED DESCRIPTION OF THE PREFERRED EMBODIMENT(S)

Based upon incorporation by external reference, the current application incorporates all disclosures in the corresponding foreign priority document, Japanese Patent Application 2002-011590 from which the current application claims priority.

Figure 1:
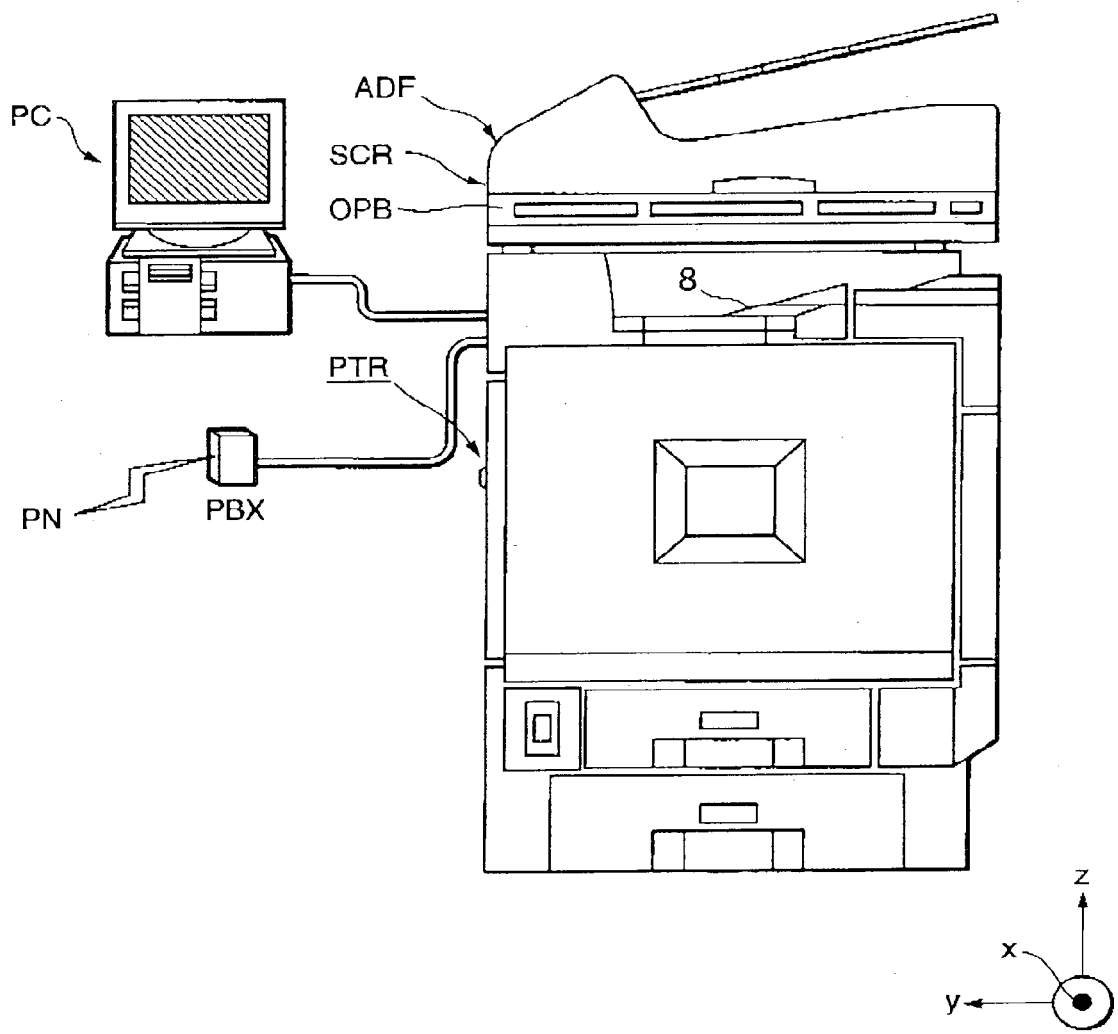
FIG. 1 is a diagram illustrating one preferred embodiment in the multifunctional full color digital copier according to the current invention.

Referring now to the drawings, wherein like reference numerals designate corresponding structures throughout the views, and referring in particular to FIG. 1, a diagram illustrates one preferred embodiment in the multifunctional full color digital copier according to the current invention. The full color digital copier generally includes an automatic document feeder ADF, an operation board OPB, a color scanner SCR and a color printer PTR. The full color digital copier further includes a color image data processing device or ACP, which will be later described with respect to FIG. 3. The ACP is connected to a personal computer PC via local area network LAN and or a telephone line PN for a facsimile communication line via a telephone switch PBX. As will be described with respect to FIG. 3, the switch PBX is connected to a facsimile board of a facsimile control unit FCU. The printed sheets from the printer PTR are outputted on a sheet tray 8.

Figure 2:
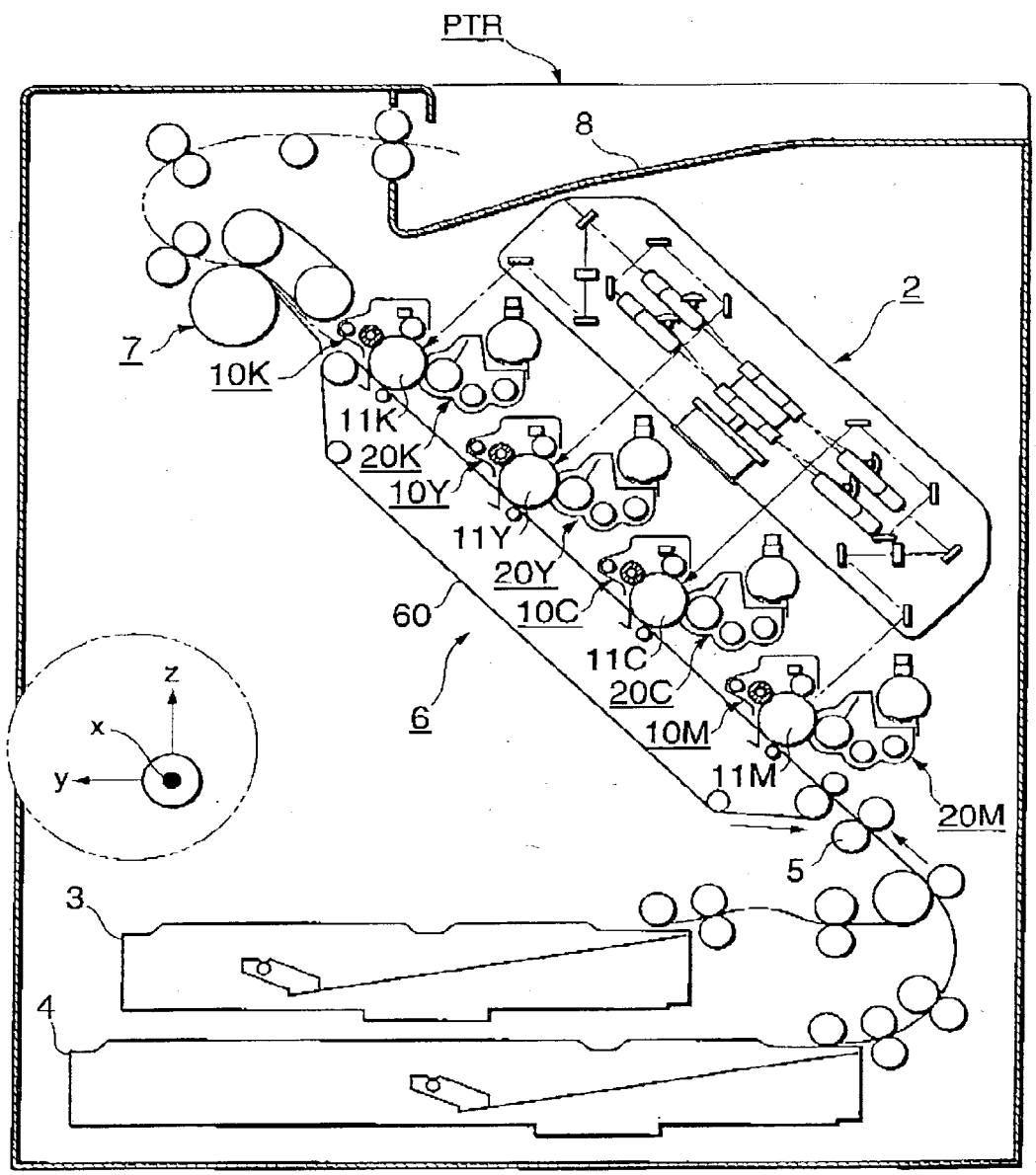
FIG. 2 is a diagram illustrating one preferred embodiment in the color printer according to the current invention.

Now referring to FIG. 2, a diagram illustrates one preferred embodiment in the color printer according to the current invention. The color printer PTR is a laser printer and includes four toner image forming units for forming a magenta image (M), a cyan image (C), a yellow image (Y) and a black image (K). An image recording medium such as paper travels from a lower right corner to an upper left corner of the diagram. The image forming device includes a set of the four full color drum image forming units. The M, C, Y and K image forming units respectively further include photosensitive units 10M, 10C, 10Y and 10K and developing units 20M, 20C, 20Y and 20K. The photosensitive units 10M, 10C, 10Y and 10K respectively further include photosensitive drums 11M, 11C, 11Y and 11K. The photosensitive drums 11M, 11C, 11Y and 11K are placed so that the rotational axis of the photosensitive drums 11M, 11C, 11Y and 11K is parallel to the X axis in the diagram. The image forming medium or paper path is designed to have an approximately 45 degrees with respect to the Y axis on the Y-Z plane. The photosensitive drums 11M, 11C, 11Y and 11K each have a photosensitive drum in the diameter of 30 mm with a layer of organic photosensitive material (OPC).

Still referring to FIG. 2, the laser printer PTR additionally further includes an optical writing unit 2 in a laser main scanning direction, a paper cassette 3, a pair of roller 5, a transfer belt unit 6 having an image transfer belt 60 for transferring the image recoding sheet to each toner image transfer position of the toner image forming units, a fixing unit 7 for a belt fixing method and an output paper tray 8. Although it is not shown in the diagram, the laser printer PTR also includes a manual feed tray, a toner filling container, a used toner bottle, a double side printing unit and a power source unit. The optical writing unit 2 further includes a light source, a polygon mirror, f-θ lens and a reflector mirror. The optical writing unit 2 projects laser towards the surface of the photosensitive drums 11M, 11C, 11Y and 11K in the X direction according to the image data. The single dotted line in the diagram indicates a paper path or an image recording medium path. An image recording medium from the paper cassette 3 and 4 is guided by undisclosed transfer guides and transferred by undisclosed transfer rollers towards the register roller 5. At a predetermined timing, the image recording medium is transferred onto the image transfer belt 60 by the register roller 5 for passing at the image transfer position of each of the toner image forming units. The toner image formed on the photosensitive drums 11M, 11C, 11Y and 11K is transferred onto the image recording medium that is held and transferred by the image transfer belt 60. Each of the toner image is superimposed on the image recording medium or the image transfer sheet. Then, the image transfer sheet is sent to the fixing unit 7. As the image transfer sheet passes the fixing unit 7, the image is fixed on the image transfer sheet. The image fixed transfer sheet is outputted in the output tray 8. As described above, the transfer method in the above example is a direct transfer method where a toner image is directly transferred onto an image transfer sheet.

The toner image forming units are essentially identical except for the color of the toner. For example, as described above, the yellow toner image forming unit further includes the yellow photosensitive unit 10Y and the yellow developing unit 20Y. The yellow photosensitive unit 10Y further includes a brush roller for placing lubricant over the photosensitive drum surface, a cleaning blade for cleaning the photosensitive drum surface, a cleaning lamp for lighting the photosensitive drum surface and a non-contact charging roller for uniformly charging the photosensitive drum surface in addition to the photosensitive drum 11Y. The yellow photosensitive drum 11Y is uniformly charged by the AC-charged charging roller, and the optical writing unit 2 forms a static image on the surface of the photosensitive drum 11Y by laser L projected by the polygon mirror that is modulated based upon the print data. The yellow developing unit 20Y develops the static image on the surface of the photosensitive drum 11Y into a yellow toner image. The yellow toner on the photosensitive drum 11Y is transferred onto the image transfer sheet at a predetermined yellow developing position on the transfer belt 60. After the toner is transferred, the photosensitive drum surface 11Y is brushed with the lubricant by the brush roller, then cleaned by the cleaning blade and further cleaned by the removing lamp for a next static image formation.

Still describing the yellow unit, the yellow developing unit 20Y stores magnetic carrier and negatively charged toner and further includes a developing roller, a transfer screw, a doctor blade, a toner concentration censor and a powder pump. The above components are placed in such a way to expose through an opening from the photosensitive drum side in the developing case. The developer in the developing case is frictionally charged by agitation and transfer that is caused by the transfer screw. A portion of the charged developer is retained on the developer roller surface. The doctor blade uniformly controls the thickness of the developer layer on the developer roller. The toner in the developer on the developer roller surface then is transferred onto the photosensitive drum surface so that the toner image appears according to the static image on the yellow photosensitive drum surface 11Y. The toner concentration in the developer case is monitored by the toner concentration sensor, and the toner is supplied by the powder pump when the concentration is detected to be low.

The transfer belt unit 6 includes the transfer belt 60, which is an edgeless single layer having high resistance volume ratio of $10^9$-$10^{11}$ Ωcm. The material is poly vinyl fluoride (PVDF). The transfer belt 60 is held by four rollers so that the transfer belt 60 travels through each of the transfer positions that contact the photosensitive drums 11M, 11C, 11Y and 11K. Among the four rollers, two of them near the entry of the image transfer sheet path as indicated by the double-dotted line are also opposed with a static controlled roller that is charged at a predetermined voltage level. The image transfer sheet that passes through these two charged rollers is statically clung onto the transfer belt 60. The other two rollers near the output along the image sheet transfer path frictionally drive the image transfer belt 60. Although it is not shown in the diagram, these two driving rollers are also connected to a driving source. In addition, a bias roller contacts the outer surface of the transfer belt 60, and the bias roller is biased by a voltage source for cleaning the residuals such as toner from the transfer belt surface. The transfer belt 60 also includes a transfer bias voltage material on the inner or back surface where the photosensitive drums 11M, 11C, 11Y and 11K oppose. The transfer bias voltage material is a fixed brush for biasing at a predetermined transfer bias voltage from a bias voltage source. The transfer bias voltage through the transfer bias voltage material adds the transfer voltage to the transfer belt 60 and forms a predetermined strength of electric field for the corresponding transfer between the transfer belt 60 and the photosensitive drum at the transfer position.

Figure 3:
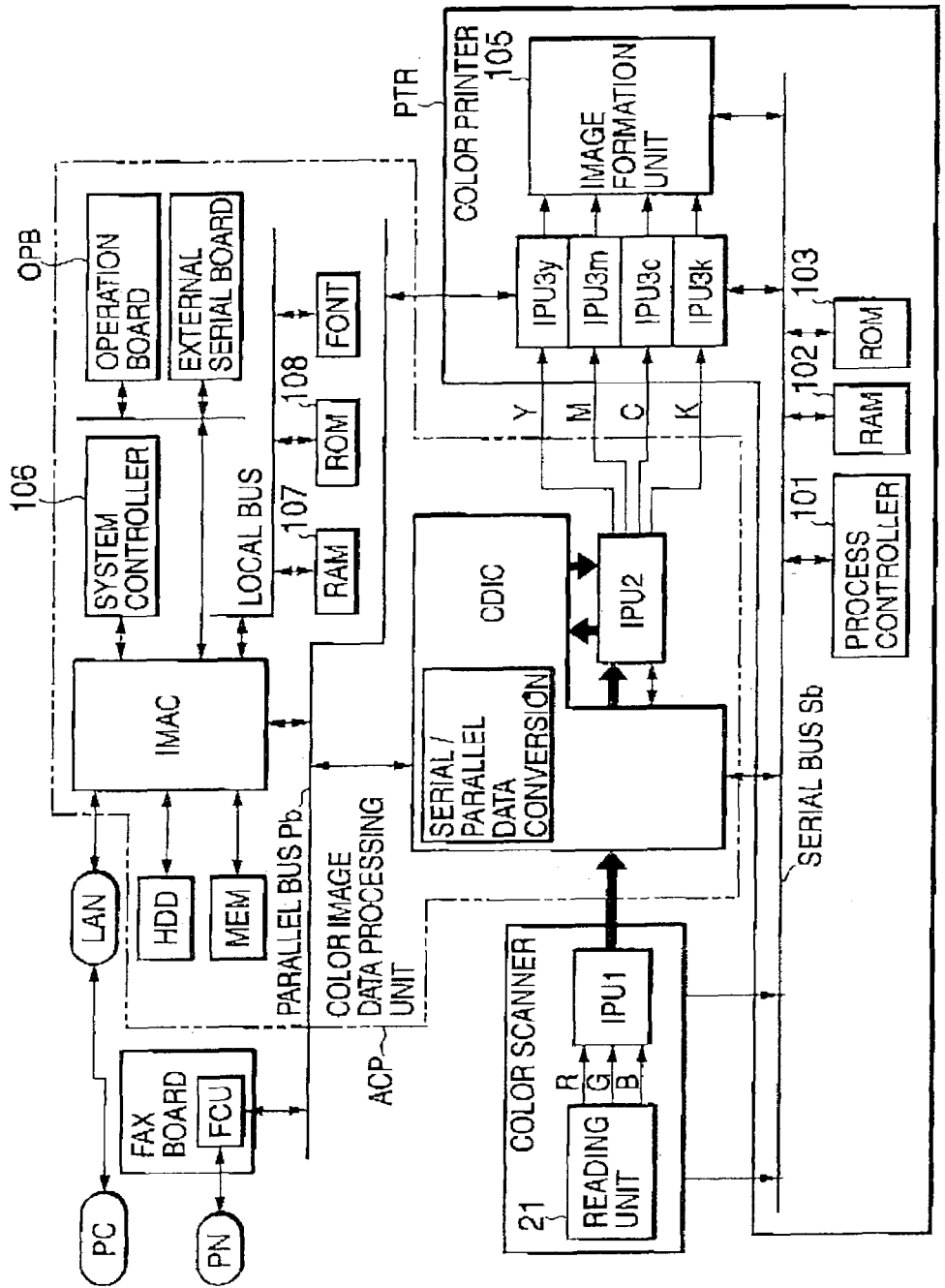
FIG. 3 is a diagram illustrating one preferred embodiment of the main electric system of the multifunctional digital copier as shown in FIG. 1 according to the current invention.

Now referring to FIG. 3, a diagram illustrates one preferred embodiment of the main electric system of the multifunctional digital copier as shown in FIG. 1 according to the current invention. A color scanner SCR optically reads an original document, and a reading unit 21 focuses the reflected light from the original document onto photosensitive elements such as CCD's via a reflector mirror and lenses. The CCD's are located on a sensor board unit (SBU) of the reading unit 21, and the SBU converts the RGB image signals from the CCD's into 8-bit RGB multi-value digital signals. The SBU then sends the RGB digital signals to a first image processing unit IPU1. The IPU1 performs the reading correction processes on each color component of the RGB image input data. The reading correction processes include CCD between-line correction, a main scanning register adjustment, shading correction, dot correction, vertical stripe correction and γ correction. Other processes also include an area separation process where an edge or inside of binary lines and characters are determined. The area separation also separates dot image such as photographs. Lastly, the area separation separates chromatic elements from achromatic elements. Another process is to distinguish certain duplication prohibited material such as currency notes and stock holding certificates based upon the RGB image data.

Still referring to FIG. 3, the IPU1 adds the image area data Fd indicative of the area separation results to the corrected 8-bit multi-value RGB image data and outputs the resulted data to a compression decompression color data interface control (CDIC) unit. For example, if the area separation indicates that the original document is prohibited from duplication, the ICU1 reports the result to a system controller 106. In response to the report, the system controller 106 substantially changes the color duplication scheme or the scanner γ conversion in the IPU1 by referring to the image process conditions that are associated with scanning a document image by the color scanner SCR. The CDIC unit transfers the RGB data, the YMCK image data and the associated image area data Fd among a second image processing unit IPU2 and a parallel bus Pb. The CDIC unit also communicates to control the image data transfer and other control signals mainly among the reading unit 21, a process controller 101 for controlling an image forming process in the color printer PTR and the system controller 106 for controlling the digital copier as shown in FIG. 1. The process controller 101 and the system controller 106 communicate with each other via the parallel bus Pb, the CDIC and a serial bus Sb. The CDID internally performs a data format conversion for interfacing the serial bus Sb and the parallel bus Pb.

The RGB data with the area separation data Fd from the IPU1 of the color scanner SCR will be hereunder simply referred to as the RGB data. The RGB data is outputted or transferred via the CDIC to the IPU2 or the parallel bus Pb. The RGB data on the parallel bus Pb is written to an image memory (MEM) unit by an image memory access control (IMAC) unit. The RGB data is then read from the MEM unit, and it is outputted to a facsimile control unit (FCU) in case of facsimile transmission otherwise to the IPU2. The IPU2 converts the RGB data into 8-bit multi-value YMCK image data and performs a number of image processing steps prior to and subsequent to the above conversion. The YMCK image data is outputted to the CDIC via the parallel bus Pb, and the IMAC stores it in the MEM unit. Alternatively, the IPU2 directly outputs the respective element of the Y, M, C and K image data to a corresponding third image processing unit IPU3$y$, IPU3$m$, IPU3$c$ and IPU3$k$. The IPU3$y$, IPU3$m$, IPU3$c$ and IPU3$k$ respectively performs a corresponding printer γ conversion on the Y, M, C and K image data and further binarizes the γ-converted Y, M, C and K image data by a gradation process for outputting the binarized data to an image formation unit 105 of the color printer PTR.

As described above, the CDIC performs a first job of storing the RGB image data or the YMCD image data in the MEME unit and reusing the stored data and a second job of directly converting the RGB image data without storing into the YMCK image data by the IPU2 for outputting to IPU3$y$, IPU3$m$, IPU3$c$ and IPU3$k$ for the print out. An example of storing in the MEM unit is a situation where one image document is duplicated into a plurality of copies. The reading unit 21 reads the document only once, and the RGB image data of the IPU1 or the converted YMCK image data from the IPU2 are stored in the MEM unit. The stored data is read a desired number of times for the multiple duplications. An example for without storing is a situation where the document is copied once. The RGB image data from the IPU1 is outputted the IPU2 as is, and the IPU3 processes the YMCK image data for the print out. It is not necessary to write the data in the MEM unit. When the MEM is not used, the image data in the CDIC unit from the IPU1 is sent to the IPU2 from the CDIC unit. The IPU2 performs on the RGB image data the intermediate processes including filtering, background removal, color mapping such as mapping to CMYK image data, color removal, main scanning sizing, main scanning shift, main scanning mirroring, sub scanning sampling, masking and digitization for monochromatic output.

The IPU3$y$, IPU3$m$, IPU3$c$ and IPU3$k$ respectively performs the corresponding printer γ conversion and gradation process on the Y, M, C and K image data. The binarized YMCK image data is sent to a laser modulator of Y, M, C and K at image formation unit 105 of the laser printer PTR. Consequently, a binary static image for each color component is formed on the photosensitive drums 11Y, 11M, 11C and 11K. The gradation process includes an intensity conversion, a dithering process and an error diffusion process, and the main process is an area approximation of the gradation information.

When the image data is stored in the MEM unit and an additional process such as rotation and composition of the image is performed on the data that is read from the memory, the data directly transferred to the CDIC unit from IPU1 is initially compressed for the bus transfer at the CDIC and is transferred to the IMAC unit via the parallel bus Pb. Based upon the control by the system controller 106, the additional processes at the IMAC include the image data and the image MEM access control, the print data generation for an external PC by character code/character bit conversions and the image data secondary compression for efficient memory use. The secondarily compressed image data at the IMAC unit is stored in the image MEM unit, and the stored data is read as necessary. The read data is decompressed unit for the secondary compression at the IMAC unit to obtain the initially compressed data. The initially compressed data is transmitted from the IMAC unit to the CDIC unit via the parallel bus Pb. At the CDIC, the transferred data undergoes another decompression process to obtain the original image data, and the original data is further transferred to the IPU2. If the further transferred data is the RGB image data, it is converted into the CMYK image data. The CMYK data is compressed as described above and is written in the MEM unit. Otherwise, the CMYK data of the IPU2 is immediately transferred to the IPU3$y$, IPU3$m$, IPU3$c$ and IPU3$k$, and the image formation unit 105 forms an image.

In the above described data flow, the preferred embodiment of the digital copier according to the current invention implements the multiple functions based upon the read/write control of the image data over the image memory MEM and the parallel bus Pb of the IMAC unit as well as the bus control among the CDIC, the IPU1 and the IPU2. One copier function, the facsimile transmission function performs at the IPU1 the reading error correction on the RGB image data from the reading unit 21 such as a color document scanner SCR. As necessary, the facsimile transmission function performs at the IPU2 the conversion on the RGB image data into the YMCK image data and transfers the converted YMCK image data to a facsimile control unit (FCU) via the CDIC and the parallel bus Pb. At the FCU, the image data is converted into data for a public line network (PN), and the converted data is sent to the PN. For the facsimile reception, the FCU converts the data from the PN into the image data and transfers the image data to the IPU2 via the parallel line Pb and the CDIC. If the received data is in the RGB data format, the IPU2 converts the RGB data into the CMYK data. On the other hand, if the received data is in the CMYK data format, the IPU2 performs no intermediate process and transfer the CMYK data to the IPU3$y$, IPU3$m$, IPU3$c$ and IPU3$k$ for image formation at the image formation unit 105. As a plurality of jobs such as copier functions, fax reception/transmission functions and printer output functions is concurrently run, the system controller 106 and the process controller 101 control the priority or the right of use for the color document scanner SCR, the color printer PTR, the parallel bus Pb and the IPU2.

The process controller 101 controls the image data flow while the system controller 106 controls the system as a whole and also manages the activation of each resource. The function selection of the multi-function digital color copier is inputted through the operation board OPB in order to specify a process such as a copier function and a facsimile function. In response to a print command from the PC, the process for the printer output function is specified by the print command. Since the corrected RGB image data from the color document scanner SCR is temporarily stored in the MEM unit, various restored images are confirmed as necessary when the process is changed in the IPU3$y$, IPU3$m$, IPU3$c$ and IPU3$k$ as well as the IPU2. For example, the γ conversion characteristics are changed. Another example is that the intensity of the reproduced image is changed. Yet another example is that the number of rows is changed in a dithering matrix. The reproduced image reflects the above changes. For each of the above changes, it is not necessary to scan the document through the color document scanner SCR since the same image data is read from the MEM unit for performing the processes with a change on the image data.

Figure 4A:
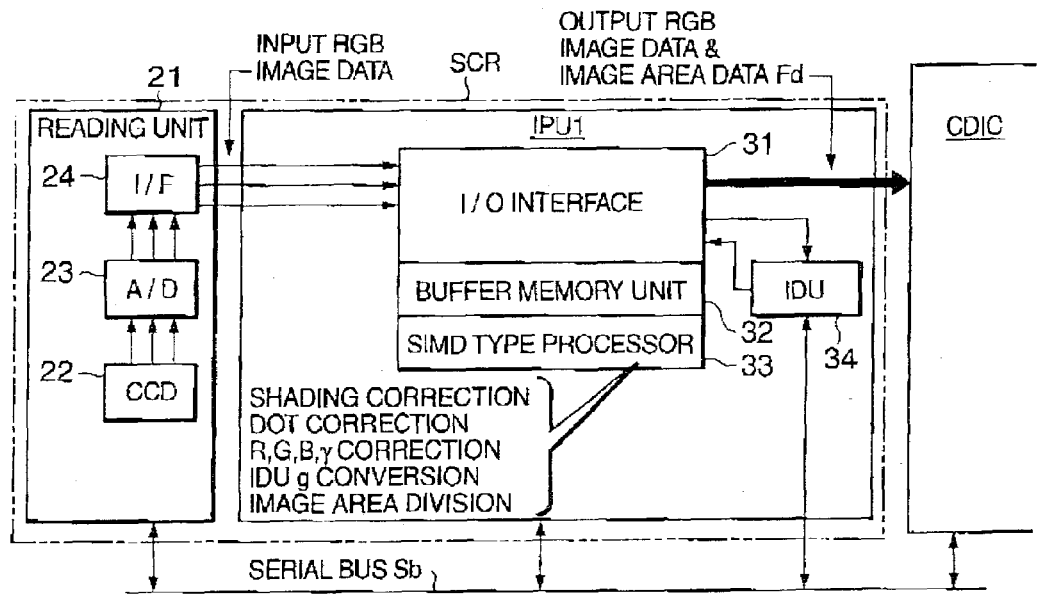
FIG. 4A is a diagram illustrating one preferred embodiment of the color document scanner according to the current invention.

Now referring to FIG. 4A, a diagram illustrates one preferred embodiment of the color document scanner according to the current invention. CCD's 22 generate RGB image signal, and an analog-to-digital (A/D) converter 23 converts the RGB image signal into 8-bit multi-color RGB image data. The converted RGB image data is transferred to the IPU1 via an interface (I/F) unit 24. The main component of the IPU1 is a color image processing unit that combines an input/output (I/O) I/F 31, a buffer memory device 32 and a data processing device or SIMD-type processor 33.

Figure 5:
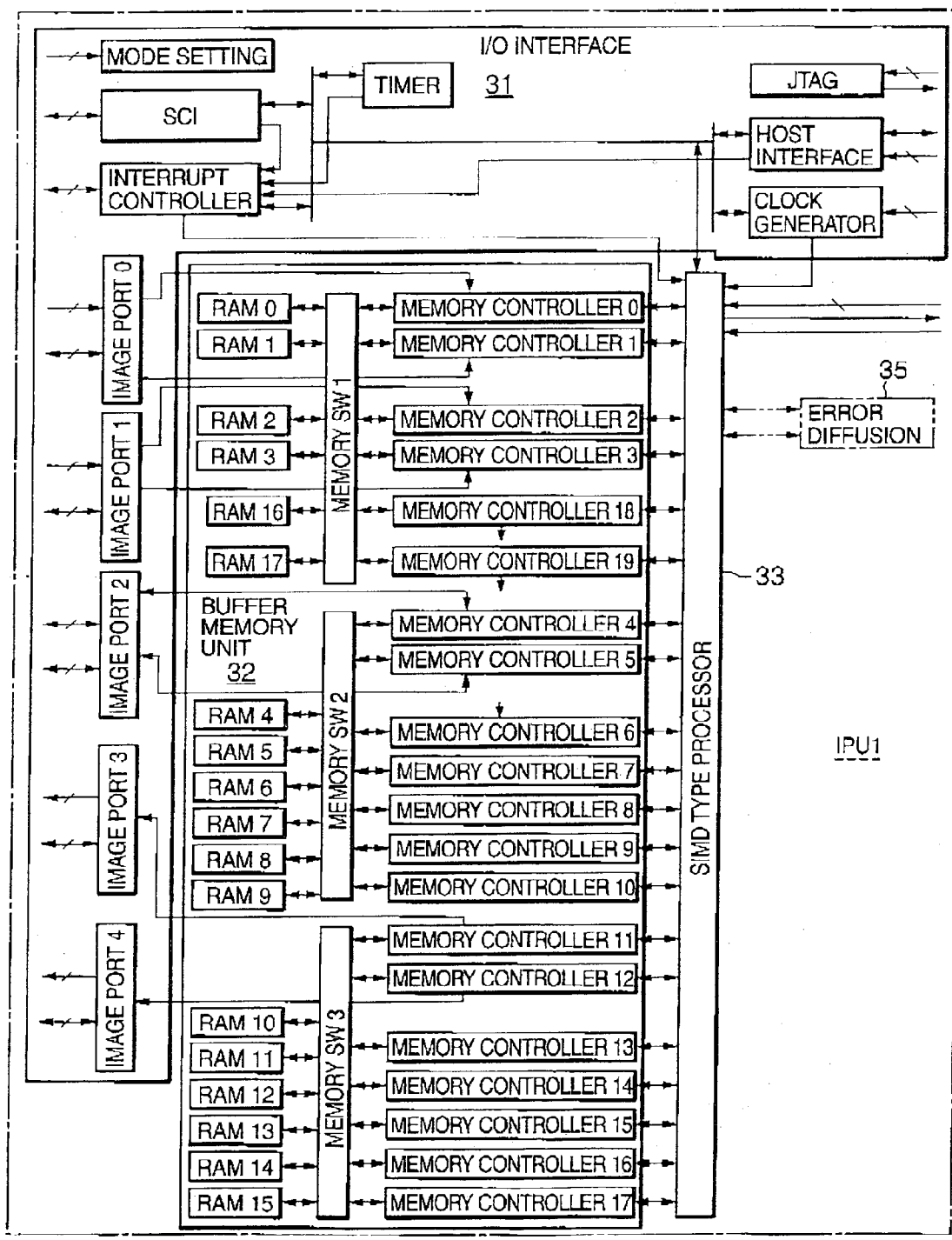
FIG. 5 is a diagram illustrating the components of one preferred embodiment of the color image processing unit of FIG. 4A according to the current invention.

Now referring to FIG. 5, a diagram illustrates the components of one preferred embodiment of the color image processing unit of FIG. 4A according to the current invention. As described above with respect to FIG. 4A, the color image processing unit combines the components 31, 32 and 33. The I/O I/F 31 further includes image ports 0 through 4 for inputting and outputting the image data, a mode setting device or mode specifying decoder for dealing control data, control signals or synchronization signals, a system control interface (SCI), an interrupt controller, a circuit automatic tester JTAG, a host I/F unit, a clock generator and a timer. The image ports 0 and 1 are exclusively for inputting image data while the image ports 3 and 4 are exclusively for outputting image data. The image port 2 is for both inputting and outputting image data. Each of the image ports 0 through 4 has a first port and a second port, and the first port and the second port concurrently inputs and outputs a byte of data. Thus, the image ports 0 through 4 each input and output two bytes of data in parallel. The RGB and YMCK color image data is multi values, 8-bit to be read for monochromatic printing and reading or to be outputted for printing. For monochromatic mode processes, two sets of image data or two-pixel image data is inputted or outputted in parallel. For color mode processes, one pixel of each color component of the RGB image data is inputted and outputted in parallel.

Random access memory (RAM) 0 through 15 of the buffer memory device 32 each have eight kilo bytes of memory capacity. The eight K bytes store multi-value data for one line at 600 dots per inch (dpi) along a short edge of A3 paper for one color component of the RGB data or the CMYK data. The RAM's 0 through 15 are used as a line buffer for inputting or outputting the image data. Alternatively, the RAM 0 through 15 are also used as a look-up table (LUT) for the image data. There are sixteen of RAM units of this type for each optionally reading and writing two bytes or one byte at a time. Two RAM units 16 and 17 respectively have two-byte capacity and are used for image data circulating shift registers. When an image data transmission source and an image data reception source have a discrepancy in processing speed for serial data transmission, the image data circulating shift registers absorbs the speed discrepancy by buffering the unprocessed image data. The RAM units 0 through 17 are each connected to one of memory switches (SW) 1 through 3.

Among the image ports 0 through 4, the memory switch SW1 through SW3 and the SIMD-type processor 33, memory controllers 0 through 17 are interconnected. The memory controllers 0 through 5, 11 and 12 that are connected to the image ports 0 through 4 perform data input/output functions according to the input/output mode from the SIMD-type processor 33. For the above memory controllers, the image ports, the SIMD-type processor 33 and the RAM units 0 through 17 become a data transmission source as well as a data reception source. Other memory controllers 6 through 10 and 13 through 19 also has a data selection function for the data transmission direction according to the input/output mode from the SIMD-type processor 33. For these memory controllers, the SIMD-type processor 33 and the RAM units 0 through 17 become a data transmission source as well as a data reception source. However, these memory controllers do not have a function for connecting the image ports. Any one of the memory controllers 0 through 19 sets the memory SW1 through SW3 to connect to one of the RAM units 0 through 17 according to the RAM selection from the SIMD-type processor 33. Each one of the memory controllers 0 through 19 further includes a direct memory access controller (DMAC), a setting register for storing memory setting information from the SIMD-type processor 33, a management register for storing the RAM connection information from the SIMD-type processor 33. The DMAC units further includes an address counter for storing an address for reading and writing in the connected RAM units 0 through 17, a starting address latch, an ending address register, a use mode register for storing information indicative of buffer memory or LUT use and a memory input/output control circuit. The starting address latch, the ending address register and the use mode register each store a plurality of the corresponding information for each of multiple memory areas in the RAM units.

The memory input/output control circuit includes a decoder for decoding the data group in the above setting register and the above management register. The decoder further generates a control signal to the data reception side and a timing signal in synchronization with the data transfer timing signal for the data transfer side. The 8K-byte RAM units 0 through 15 further include a ½ frequency divider for dividing the pixel synchronization pulse which is used to generate odd or even pixel synchronization signals. The odd or even pixel synchronization signals are used to separate and to consolidate one line of odd-numbered pixel data and even-numbered pixel data. When data is written to or read from the buffer memory RAM units 0 through 17, the above decoder of the memory input/output control circuit compares the pixel address in the address counter to the beginning address in the starting address register and the ending address in the ending address register to determine the current RAM access memory area. The above decoder then reads the use mode information from the use mode register for the determined RAM access memory area and decodes the use mode information into an operation mode control signal. Finally, the memory input/output control circuit controls the read and write operation with respect to the RAM units 0 through 17 based upon the operation mode control signal.

By the memory controller setting information, one memory controller of the memory controllers 0 through 19 is selected as a selected memory controller A for connecting with a RAM unit a that is selected from the RAM units 0 through 17, assuming that the buffer memory is selected for the use mode, the selected memory controller A sets the data selector in the memory switch SW1 through SW3 so that the selected memory controller A accesses the selected RAMa unit. In this case, for example when the memory controller setting information specifies an input color image data read operation, the color image data from the specified image port is written to the RAMa unit that is selected by the processor 33. When the use mode of the RAM units is LUT or the conversion table and the memory controller setting information is LUT or write LUT data to the RAM, a selected memory controller B from the memory controllers 0 through 19 writes the γ conversion data from the SIMD-type processor 33 in one RAMb unit selected by the processor 33 from the RAM units 0 through 15 in the memory area raging from the beginning address and the ending address that are specified by the processor 33. When the memory controller setting information specifies the color image data gradation conversion such as a γ conversion using a LUT, one memory controller C selected from the memory controllers 0 through 19 outputs the input image data from one RAMc unit of the RAM units 0 through 15 or one of the image ports that the processor 33 specifies as address data. The above memory controller B accesses the RAMb unit containing the LUT based upon the address data. The memory controller B reads the corresponding γ conversion data for the input image data and writes the γ conversion data in one RAMd unit of the RAM units 0 through 15 that the processor specifies. Alternatively, the memory controller B outputs the γ conversion data to the image port. If the use mode in the memory controller setting information is the transfer of the color image data, the processor 33 outputs to the image port the color image data in one RAMe unit selected from the RAM units 0 through 15.

Figure 6A:
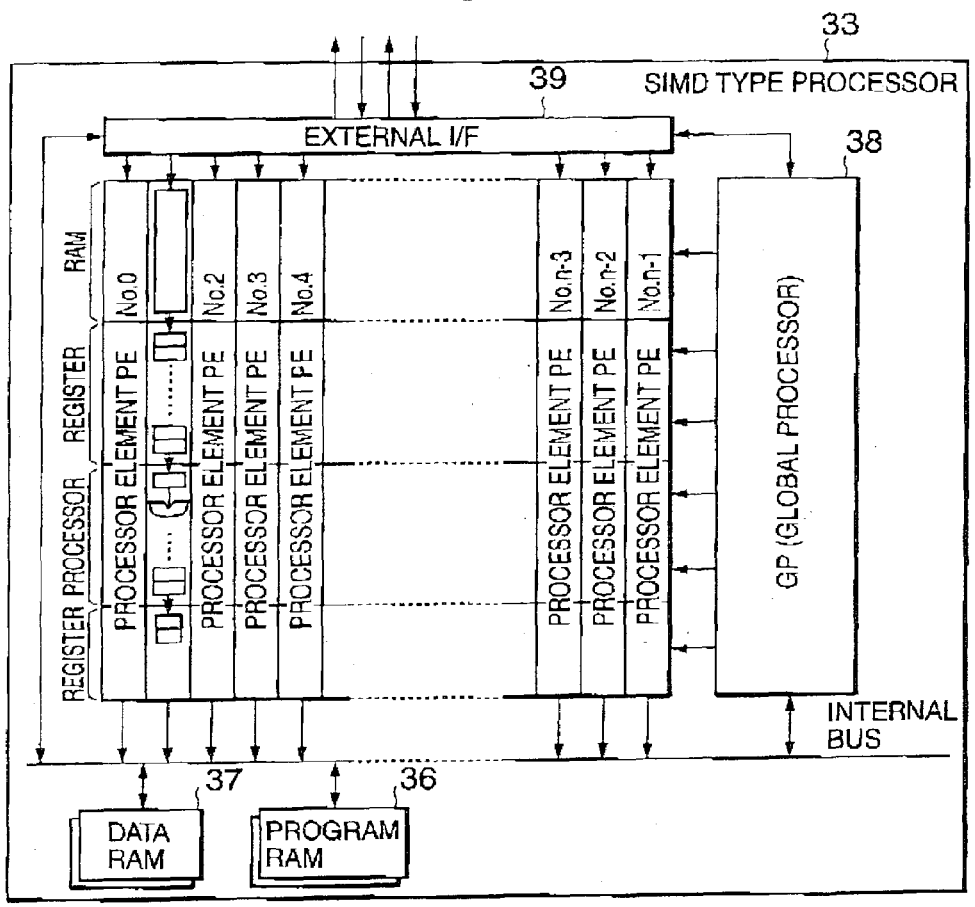
FIG. 6A is a diagram illustrating the components of one preferred embodiment of the SIMD-type processor of FIG. 5 according to the current invention.
Figure 6B:
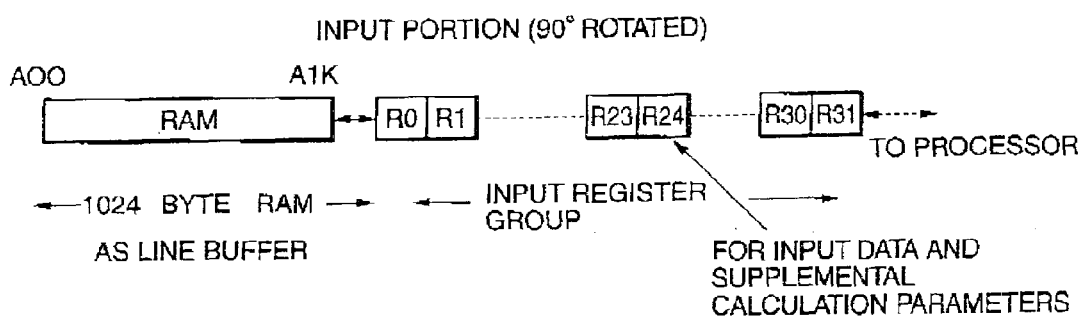
FIG. 6B is a diagram illustrating the components of one preferred embodiment of the processor element PE of FIG. 6A according to the current invention.

Now referring to FIG. 6A, a diagram illustrates the components of one preferred embodiment of the SIMD-type processor of FIG. 5 according to the current invention. FIG. 6B is a diagram illustrating the components of one preferred embodiment of the processor element PE of FIG. 6A according to the current invention. As will be described with respect to FIG. 8, the processor element PE group is a data process device.

The SIMD-type processor 33 is a data processing device. The data processing device further includes a processor element PE local RAM-based memory group and controls a memory area and a data path according to a data bus control in a global processor 38. The input data and the output data are stored in the local memory RAM groups as a buffer memory and are outputted to an external element via an external interface (I/F) 39. The global processor 38 simultaneously offers the same command to the three-hundred twenty processor elements PE which concurrently perform an identical image process on at least 8-bit image data in the local memory RAM units. The computation results from the processor element PE is again stored in the local memory RAM unit and is outputted to the memory controller through the external I/F 39. The process operation of the processor element PE and the associated parameters are transferred between a program RAM 36 and a data RAM 37. For the program RAM 36 and the data RAM 37, the programs and data in a hard disk HDD are downloaded via the IMAC, the parallel bus Pb, the CDIC and the serial bus Sb in response to a command from the system controller 106. The DMAC in the external I/F 39 performs the above data transfer in response to a command from the system controller 106. A processor controller 101 sets the data flow in response to a demand from the DMAC. The system controller 106 selects the data set to be transferred from the HDD to the program RAM 36 and the data RAM 37. When the image process or the image combination as called for by the system is changed, the above system controller selection is correspondingly changed by the instruction from the operation board OPB or the PC. Alternatively, the data set to be transferred from the HDD to the program RAM 36 and the data RAM 37 is rewritten in response to the above changes.

Figure 7:
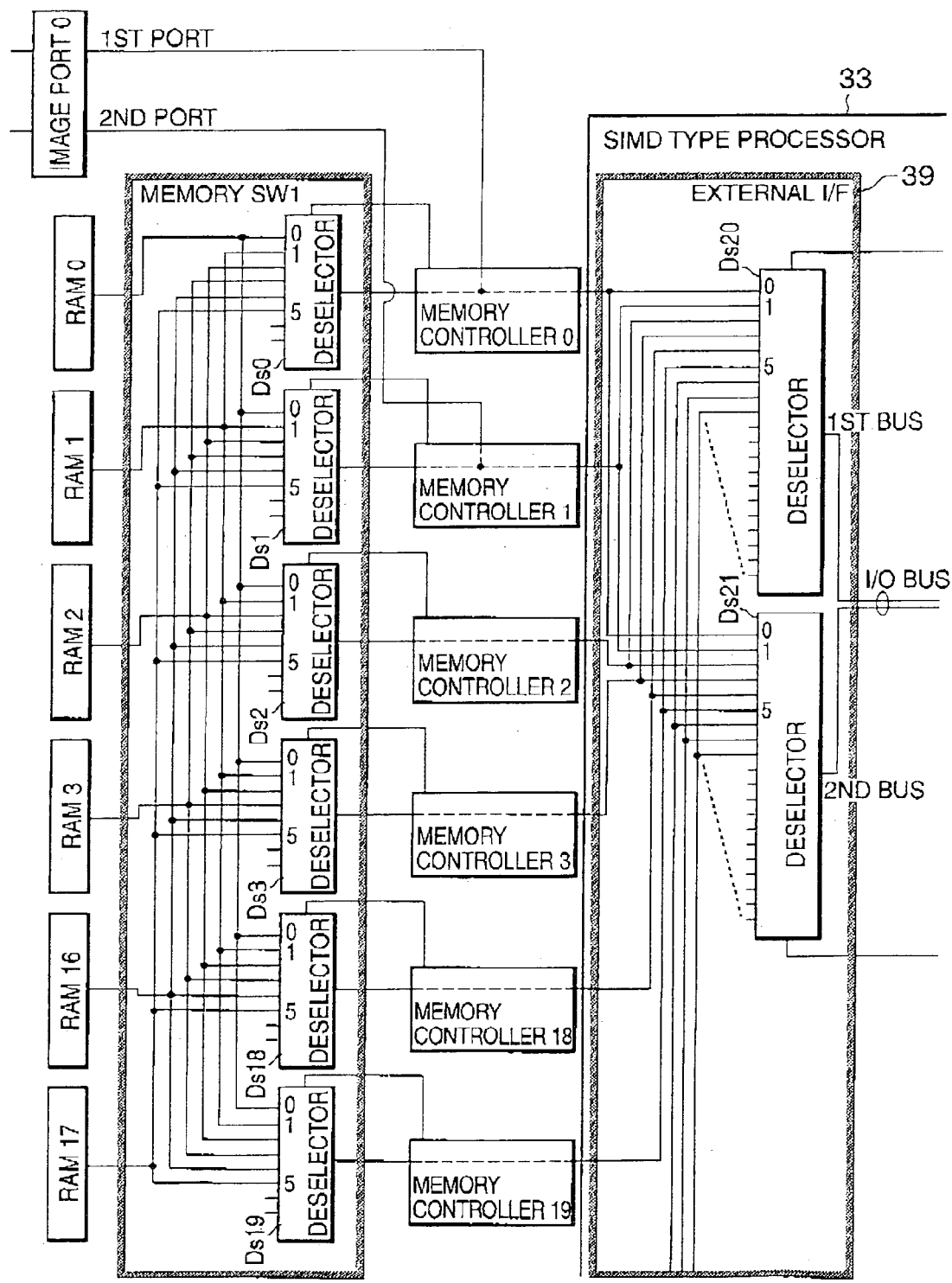
FIG. 7 is a diagram illustrating data lines for one preferred embodiment between the SIMD-type processor 33 and the RAM units 0 through 3, 16 and 17 of FIG. 5 according to the current invention.

Now referring to FIG. 7, a diagram illustrates data lines for one preferred embodiment between the SIMD-type processor 33 and the RAM units 0 through 3, 16 and 17 of FIG. 5 according to the current invention. A single line indicates a pair of bus lines for transferring 8-bit data in parallel. The first memory switch SW1 includes a first group of data selectors Ds 0 through Ds 3, Ds 18 and Ds 19 that are respectively connected to a first group of memory controllers 0 through 3, 18 and 19 for accessing the above RAM units. A common port for each of the first group of the six data selectors is connected to the contact port on the buffer side of the memory controller in the first group. The $0^{th}$ through $5^{th}$ selection ports of the data selectors in the first group are respectively connected to the RAM units 0 through 3, 16 and 17. The connection ports on the data processing side of the memory controllers in the first group are respectively connected to $0^{th}$ through $5^{th}$ selection ports of a pair of data selectors Ds 20 and Ds 21 in the external I/F 39 in the SIMD-type processor 33. The common ports in the first and second data selectors Ds 20 and Ds 21 in the external I/F 39 are connected to a first and second input/output bus lines in the external I/F 39 in the SIMD-type processor 33. The selection ports and the common ports of the above data selectors Ds 20 and Ds 21 both input and output 8-bit data in bit parallel. As shown in FIG. 5, the data line connections are the same with that for the above first group for the second and third groups of the RAM units 4 through 9 and 10 through 15, the second and third group of the memory switch SW2 and SW3 and the data selectors Ds 20 and Ds 21 in the external I/F 39.

The global processor 38 of the SIMD-type processor 33 as shown in FIG. 6A gives the first data selector Ds 20 port selection data or control data specifying one memory controller such as the memory controller 0. The global processor 38 also gives the second data selector Ds 21 control data specifying one memory controller such as the memory controller 1. In the above case, the common ports of the first and second memory controllers 0 and 1 are respectively connected to the first and second input/output bus lines in the external I/F 39 in the SIMD-type processor 33. When the global processor 38 gives the memory controllers 0 and 1 setting information respectively specifying the RAM units 0 and 1 as shown in FIG. 6B, the memory controller 0 gives the data selector Ds 0 the port selection data for specifying the $0^{th}$ port or the RAM unit 0, and the data selector Ds 0 connects the RAM unit 0 to the memory controller 0. Similarly, the memory controller 1 gives the data selector Ds 1 the port selection data for specifying the $1^{st}$ port or the RAM unit 1, and the data selector Ds 1 connects the RAM unit 1 to the memory controller 1. Thus, the first input/output bus line in the external I/F 39 in the SIMD-type processor 33 is connected to the RAM unit 0 while the second input/output bus line is connected to the RAM unit 1.

Since the memory controllers 0 and 1 receive data from the $1^{st}$ and $2^{nd}$ port of the input image port 0, when the global processor 38 gives the setting information specifying the $1^{st}$ or $2^{nd}$ port of the input image port 0 in stead of specifying RAM unit 0 or 1, the memory controller 0 connects the $1^{st}$ port of the input image port 0 to the $0^{th}$ port of the data selector Ds 20. Similarly, the memory controller 1 connects the $0^{th}$ port of the input image port 0 to the $1^{st}$ port of the data selector Ds 21. Thus, the first input/output bus line in the external I/F 39 in the SIMD-type processor 33 is connected to the $1^{st}$ port of the input image port 0 while the second input/output bus line is connected to the $2^{nd}$ port of the input image port 0.

The global processor 38 of the SIMD-type processor 33 selectively connects the first and second input/output bus lines in the external I/F 39 to one 8-bit data input/output port from the RAM units 0 through 17 and the image port 0 through 4 by the control according to the information data to the above data selectors Ds 20 and Ds 21 and the memory controllers 0 through 19. That is, the input/output bus lines in the external I/F 39 concurrently input and output two pairs of data in parallel. For these inputs and outputs, any one of the RAM units 0 through 17 is used. The input/output bus lines in the external I/F 39 is connected to a RAM unit in each processor element PE group as shown in FIG. 6B, which is a data processing device. The global processor 38 sets in the memory controller a read/write DMA transfer of each of the RAM units in the processor element PE group. The global processor 38 writes in the RAM of the each element PE data from the outside of the SIMD-type processor 33. Similarly, the global processor 38 outputs data from the RAM of the each element PE to the outside of the SIMD-type processor 33. That is, data is transferred among the image ports 0 through 4 of FIG. 5, the RAM units 0 through 17 and the processor element group (PEG) of the SIMD-type processor 33.

Referring back to FIG. 4A, the image processing function of the color image process unit of the IPU1 is defined by the read process program that is written in the RAM unit or the program memory 36 in the SIMD-type processor 33. The read process program performs a CCD between-line correction, a main scanning register adjustment, shading correction, dot correction, vertical stripe correction and γ correction on the input RGB image data in the above specified order. Based upon the process RGB data even with the vertical stripe correction, the image is divided, and the area data Fd is generated. The output RGB image data has completed a read process after the identical point is identified on the image. The output RGB image data is outputted to the CDIC and the currency note recognition unit 34 that is an external unit. The scanner γ correction includes steps of providing the six RAM units 0 through 17 of the buffer memory device 32 with the RGB image data as a start address for reading the γ conversion tables for each of the RGB color component, reading the LUT corresponding to the given image data and providing the read LUT with the SIMD-type processor 33.

In further detail, the γ conversion table LUT-R is written in two of the RAM units 0 through 17 for the R image data. The even-numbered pixel R image data and the odd-numbered pixel R image data are simultaneously provided to the γ conversion table LUT-R, and the corresponding data is read from the γ conversion table LUT-R. The information data is concurrently outputted to the SIMD-type processor 33. Similarly, other two of the RAM units 0 through 17 is used for the G image data while yet other two of the RAM units 0 through 17 is used for the B image data. Based upon the γ conversion table LUT-G and the γ conversion table LUT-B, the G and B image data is respectively converted before the G and B image data is outputted to the SIMD-type processor 33. However, since the SIMD-type processor 33 is able to accept only two bytes at a time and two bytes mean the γ-converted pixel data for two pixels of the same color component, the γ conversion of the RGB image data is performed separately for the color components. The LUT generation process for the γ conversion of the RGB image data will be later described with respect to FIGS. 18, 19 and 20.

Now referring to FIG. 8a diagram of one preferred embodiment of illustrates the data conversion device which combines the SIMD-type processor 33 and the buffer memory 32 of FIG. 5 according to the current invention. The data conversion device further includes a buffer memory group BM having the RAM units 0 through 17 as well as a buffer controller BC for reading and writing data and having a memory switch SW, memory controllers 0 through 19, an external I/F 39 and a global processor 38. The buffer controller BC controls the data transfer among the image ports 0 through 4, the buffer memory BM and the processor elements PE group PEG. The global processor 38 determines the data transfer mode among the above three components as well as the data process for the processor element PEG based upon the data program in the program RAM 36. The data program in the program RAM 36 includes transfer mode data for specifying the data transfer mode and process mode data for specifying the data process in the data process device PEG. The data transfer mode data and the process mode data are both high level control data.

The global processor 38 decodes the transfer data upon reading the transfer mode data and reads from the data RAM unit 37 memory controller specifying data for selecting the data selector to corresponding to the decoded transfer mode and control information data that corresponds to the selected memory controller. The memory controller specifying data and the control information data are both low level control information. The above information is outputted to the external IF 39 and to the memory controller. Furthermore, upon decoding the transfer mode data, the global processor 38 reads from the data RAM unit 37 the corresponding data process program, reference data and the setting data for the data processing device PEG and writes them in the RAM units of each processor element of the data processing device PEG. Although the detail of the conversion data will be later provided, the control memory CM consisting of the program RAM unit 36 and the data RAM unit 37 stores the control information memory including the control information data for the buffer memory BM including the RAM units 0 through 17 and the conversion table data or computation correction data.

The buffer memory BM stores the temporarily inputted data, and a predetermined number of the stored data is simultaneously outputted to data processing device PEG. The buffer memory BM also temporarily stores a predetermined number of the processed data and outputs the same. The data processing device PEG concurrently inputs the predetermined number of the data from the buffer memory BM for processing and also concurrently outputs the already processed data. The buffer controller BC adjusts the connection between the buffer memory BM and the data processing device PEG in order to accommodate the parallel input and output operations. Based upon the conversion data in the above control information memory CM, the buffer controller BC generates a plurality of the identical conversion table in the above buffer memory BM. After a portion or entire RAM units 0 through 17 in the buffer memory BM is set for the parallel input and output operations in the data processing device PEG, the data processing device PEG concurrently inputs the predetermined number of the data from the buffer memory BM for processing and also concurrently outputs the already processed data. Alternatively, without providing the details, the data processing device PEG associates non-converted data with each of the plurality of the conversion tables and concurrently reads the converted data and the corresponding non-converted data. The data transfer among the buffer controller BC the image ports 0 through 4, buffer memory BM and each processor element in the data processing device PEG will be later described with respect to FIG. 16.

Figure 9A:
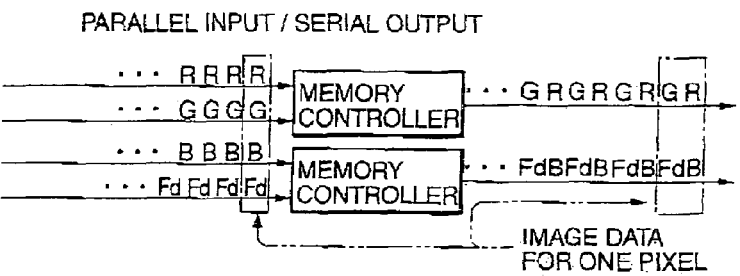
FIG. 9A is a diagram illustrating one memory controller consolidates two lines of data into a single line by combining the area data Fd and the color component data of the RGB image data from the image ports 0 through 4, the RAM units 0 through 17 or the SIMD-type processor 33.

Now referring to FIGS. 9A through 9E, diagrams illustrate types of parallel and serial conversions by one preferred embodiment of the memory controllers 0 through 19 according to the current invention. FIG. 9A shows that one memory controller consolidates two lines of data into a single line by combining the area data Fd and the color component data of the RGB image data from the image ports 0 through 4, the RAM units 0 through 17 or the SIMD-type processor 33. The RGB data includes three lines of data, and each line represents a value in one of the three color components of the RGB data. On the other hand, the area data Fd includes a single line of data. As a result of the above consolidation, two lines of parallel/serial data are generated. In this example, the double-line input data for the R image data and the G image data is converted into a single data by alternate pick up consolidation. Similarly, the B image data and the area data Fd are converted into a single line of data by alternate pick up consolidation.

Figure 9B:
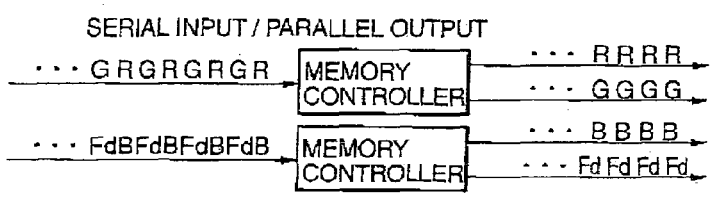
FIG. 9B is a diagram for illustrating a process of reconfiguring the above converted two single-line data of FIG. 9A back to the original two double-line data or four lines of parallel data.
Figure 9C:
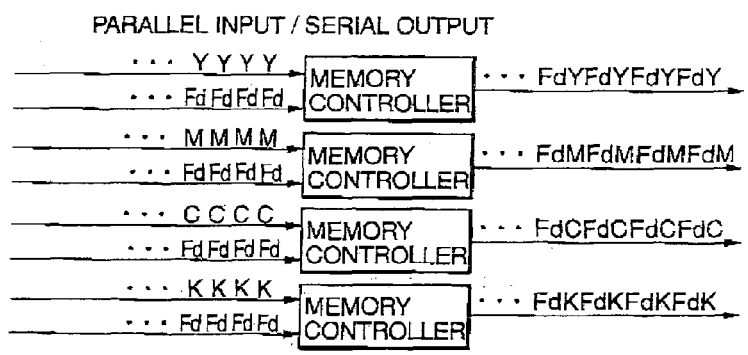
FIG. 9C is a diagram for illustrating a process of parallel-to-serial conversion of the YMCK image data output to the IPU3y, IPU3m, IPU3c and IPU3k in the buffer memory of the IPU2.
Figure 9D:
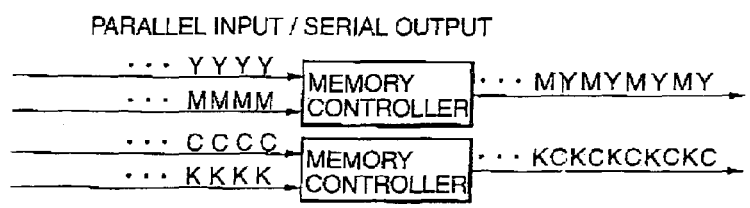
FIG. 9D is a diagram for illustrating a process of parallel-to-serial conversion of the YMCK image parallel data that is generated by the SIMD-type processor to serially output to the parallel bus Pb in the buffer memory of the IPU2.
Figure 9E:
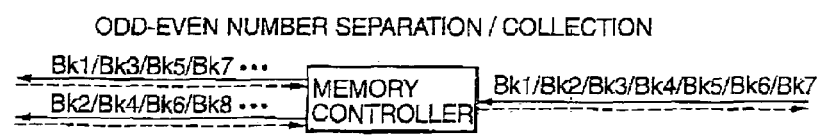
FIG. 9E is a diagram for illustrating a process of separating one line of image data into an odd-numbered pixel data row and an even-numbered pixel data row as indicated by the solid lines.

FIG. 9B is a diagram for illustrating a process of reconfiguring the above converted two single-line data of FIG. 9A back to the original two double-line data or four lines of parallel data. In other words, each line of serial data is picked up in the standing order and alternately distributed between two lines of an odd-numbered line and an even-numbered line. FIG. 9C is a diagram for illustrating a process of parallel-to-serial conversion of the YMCK image data output to the IPU3y, IPU3m, IPU3c and IPU3k in the buffer memory of the IPU2. This conversion is not practiced in the buffer memory device 32. Five lines of parallel data including four lines for the Y, M, C and K image data and a single line of the area data Fd are converted into four lines of serial data. Each of the serial data is transferred to the IPU3y, IPU3m, IPU3c and IPU3k. The IPU3y, IPU3m, IPU3c and IPU3k converts the four lines of the serial data into a pair of one color component image data Y, M, C or K and the area data Fd by a reverse conversion or serial-to-parallel conversion. FIG. 9D is a diagram for illustrating a process of parallel-to-serial conversion of the YMCK image parallel data that is generated by the SIMD-type processor to serially output to the parallel bus Pb in the buffer memory of the IPU2. This conversion is not practiced in the buffer memory device 32. This conversion is not practiced in the buffer memory device 32 of the IPU1. Four lines of parallel data including four lines for the Y, M, C and K image data are converted into two lines of serial data. To receive these two lines of the serial data, the IPU2 reconfigures back to the original four lines of the Y, M, C and K image data by a reverse conversion or serial-to-parallel conversion. FIG. 9E is a diagram for illustrating a process of separating one line of image data into an odd-numbered pixel data row and an even-numbered pixel data row as indicated by the solid lines. In contrast, the odd-numbered pixel data row and the even-numbered pixel data row are consolidated into a single data line as indicated by dotted line. Although FIG. 9E illustrates a process of separation and consolidation of the monochromatic image data BK that is outputted from the reading unit 21, the same process is applicable to the color image data. The SIMD-type processor 33 includes an output port for concurrently inputting and outputting two-byte data with an external memory controller. Not only the two-byte data, but also each of the two byte data is concurrently inputted and outputted.

Now referring to FIGS. 10A through 10G, diagrams illustrate types of parallel and serial conversions by the memory controllers 0 through 19 as well as numerical examples A through G of the data input and output mode by the IPU1, the IPU2, IPU3y, IPU3m, IPU3c and IPU3k according to the current invention. Now referring particularly to FIG. 10A, an image data flow as indicated by an arrow and a solid line Af is for "one line input separation mode." For example, in the one line separation input mode, one line of image data from the reading unit 21 is given to one selected memory controller A from the memory controllers 1 through 19 in the IPU1. The one line of the image data is either black-and-white image data in monochromatic mode or one color component of the RGB image data in a color mode. The memory controller A separates the image data of the single line into an odd-numbered pixel data row and an even-numbered pixel data row, and the odd-numbered pixel data row and the even-numbered pixel data row are concurrently transmitted to the SIMD-type processor 33. The SIMD-type processor 33 concurrently inputs and processes both of the pixel data. The SIMD-type processor 33 outputs the processed image data to one selected memory controller B from the memory controllers 1 through 19. The memory controller B consolidates the image data from the odd-numbered pixel data row and the even-numbered pixel data row to generate a single line of the image data and transfers the single line of the image data to the CDIC.

Still referring to FIG. 10A, as necessary, one of the RAM units 1 through 17 or a LUT is provided as a line buffer at an input or output side of the memory controller A or B. The memory controller A, B or C refers to the same or different memory unit in the above and the following modes. Another exemplary data flow is "one line input separation mode" as indicated by a dotted line Bf. One line of image data from the CDIC or the IPU2 is given to one selected memory controller B from the memory controllers 1 through 19 in the IPU2 or IPU3y, IPU3m, IPU3c and IPU3k. The memory controller B separates the image data of the single line into an odd-numbered pixel data row and an even-numbered pixel data row. The SIMD-type processor 33 concurrently inputs and processes both of the pixel data. The SIMD-type processor 33 outputs the processed image data to one selected memory controller A from the memory controllers 1 through 19. The memory controller A consolidates the image data from the odd-numbered pixel data row and the even-numbered pixel data row to generate a single line of the image data and transfers the single line of the image data to the IPU3y, IPU3m, IPU3c and IPU3k or the image formation unit 105.

Now referring to FIG. 10B, an image data flow as indicated by an arrow and a solid line Bf is for "odd-even pixel separation input mode." For example, in the odd-even pixel separation input mode, an odd-numbered pixel data row and an even-numbered pixel data row from one line of image data from the reading unit 21 is given to the SIMD-type processor 33 via one selected memory controller A from the memory controllers 1 through 19. The one line of the image data is either black-and-white image data in monochromatic mode or one color component of the RGB image data in a color mode. The odd-numbered pixel data row and the even-numbered pixel data row are concurrently transmitted to the SIMD-type processor 33. The SIMD-type processor 33 concurrently inputs and processes both of the pixel data. The SIMD-type processor 33 outputs the processed image data to one selected memory controller B from the memory controllers 1 through 19. The memory controller B consolidates the image data from the odd-numbered pixel data row and the even-numbered pixel data row to generate a single line of the image data and transfers the single line of the image data to the CDIC.

Still referring to FIG. 10B, another exemplary data flow is "one line separation output mode" as indicated by a dotted line Br. One line of image data from the CDIC or the IPU2 is given to the memory controller B. The memory controller B separates the image data of the single line into an odd-numbered pixel data row and an even-numbered pixel data row. The SIMD-type processor 33 concurrently inputs and processes both of the pixel data. The SIMD-type processor 33 outputs the processed image data to the memory controller A. The memory controller A concurrently transfers the two lines of the odd-numbered pixel data row and the even-numbered pixel data row to the IPU3y, IPU3m, IPU3c and IPU3k or the image formation unit 105.

Now referring to FIG. 10C, an image data flow as indicated by an arrow and a solid line Cf is for "multi color concurrent process mode." For example, in the multi color concurrent process mode, two R and G color components of the RGB image data from one line of image data from the reading unit 21 is given to the SIMD-type processor 33 via one selected memory controller A from the memory controllers 1 through 19. The two R and G color components of the RGB image data is concurrently transmitted to the SIMD-type processor 33. The SIMD-type processor 33 concurrently inputs and processes both of the RGB data. The SIMD-type processor 33 outputs the processed RGB image data to one selected memory controller B from the memory controllers 1 through 19. The memory controller B consolidates two R and G color components of the RGB image data to generate a single line of the image data and transfers the single line of the image data to the CDIC.

Still referring to FIG. 1C, another exemplary data flow is "multi color separation output mode" as indicated by a dotted line Cr. One line of alternate R and G image data from the CDIC is given to the memory controller B. The memory controller B separates the image data of the single line into two lines of the R and G color components of the RGB image data. The SIMD-type processor 33 concurrently inputs and processes both of the R and G image data. The SIMD-type processor 33 outputs the processed image data to the memory controller A. The memory controller A concurrently transfers the two lines of the image data to the CDIC.

Now referring to FIG. 10D, an image data flow as indicated by an arrow and a solid line Df or Dr corresponds the data flow as indicated by the direction Cf and Cr as described with respect to FIG. 10C. However, since the color scanned RGB image data is three-line, another line of data X is added. The data X is either dummy data or the image area data Fd.

Now referring to FIGS. 10E and 10F, an image data flow as indicated by an arrow and a solid line Ef or Ff is for "multi color concurrent process mode." For example, in the multi color concurrent process mode, two lines of the Y-M and C-K components of the YMCK image data from is concurrently given to the SIMD-type processor 33 via the memory controller A. The SIMD-type processor 33 concurrently inputs and processes both of the YMCK data. The SIMD-type processor 33 outputs the processed YMCK image data to one selected memory controller B from the memory controllers 1 through 19. The memory controller B consolidates two lines of the Y-M and C-K components of the YMCK image data to generate a single line of the image data and transfers the single line of the image data to the CDIC.

Still referring to FIGS. 10E and 10F, another exemplary data flow of the one line input separation mode as indicated by a dotted line Er or Fr is that one line of alternate Y-M and C-K components of the YMCK image data from the CDIC is given to the memory controller B. The memory controller B separates the image data into two line of the Y-M and C-K components of the YMCK image data. The SIMD-type processor 33 concurrently inputs and processes both of the Y-M and C-K components of the YMCK image data. The SIMD-type processor 33 outputs the processed image data to the memory controller A. The memory controller A concurrently transfers the two lines of the image data to the IPU3y, IPU3m, IPU3c and IPU3k.

Now referring to FIG. 10G, an image data flow as indicated by an arrow and a solid line Cf is for "black-and-white multiple line process mode." For example, in the black-and-white multiple line process mode, two lines of black-and-white image data is given to the SIMD-type processor 33 via one selected memory controller A. The two lines of black-and-white image data are concurrently transmitted to the SIMD-type processor 33. The SIMD-type processor 33 concurrently inputs and processes both lines of the black-and-white image data. The SIMD-type processor 33 outputs the processed black-and-white image data to one selected memory controller B. After processing at the memory controller B, the processed data is sequentially stored in line memory units or RAM 0 through 17. After completing the storage, each line of the processed data is sent to the CDIC.

Still referring to FIG. 10G, another exemplary data flow is "black-and-white multiple line output mode" as indicated by a dotted line Gr. Two lines of the image data from the CDIC or IPU2 is given to the memory controller B at the IPU2 or IPU3k. The memory controller B stores the image data in the line memory from the RAM units 0 through 17. The SIMD-type processor 33 concurrently inputs and processes the two lines of the image data. The SIMD-type processor 33 outputs the processed image data to the memory controller A. The memory controller A concurrently transfers the two lines of the image data to the IPU3k or the image forming unit 105.

The memory controller or the SIMD-type processor 33 input, output or process a single line of the image data. Each memory controller alone as shown in the memory controller B or C has functions for performing a serial or parallel conversion for a single line input/double line output format (parallel conversion) or for a double line input/single line output format (serial conversion). The memory controller A is shown in FIGS. 10B through G. The memory controller B is shown in FIGS. 10B through F without the SIMD-type processor 33. Using the above functions to transfer the RGB image data with the area data Fd, the R and G image data is outputted to the CDIC after the data is serially converted into a double line input/single line output format as shown in the data flow Cf in FIG. 10C. On the other hand, the B image data with the area data Fd are converted into a double line input/single line output format as shown in the data flow Df in FIG. 10D before the single line data is transferred to the CDIC. When the YMCK data and the area data Fd is transferred from IPU2 to the IPU3y, IPU3m, IPU3c and IPU3k, respective color component of the YMCK and the area data Fd are converted into a double line input/single line output format as shown in the data flow Cf in FIG. 10C at each of four memory controllers of the IPU2. Each of the converted single line of the image data is respectively transferred to the IPU3y, IPU3m, IPU3c and IPU3k. Each memory controller of the IPU3y, IPU3m, IPU3c and IPU3k performs the single line input/double line output format conversion to generate two lines of data from each color component of the CMYK image data and the area data FD.

In this example, since the image port of the buffer memory device 32 inputs and outputs two bytes or sixteen bits in parallel, two lines of the image data are concurrently inputted or outputted. Between the image port and the SIMD processor 33 via the memory controller, two lines of the image data are simultaneously and concurrently inputted and outputted. In this case, in any data flow as shown in FIGS. 10A through 10G, the image data is inputted to the memory controller A from the image port. In case of the data flow in FIG. 10A, a single line of the image data is inputted while in case of the data flows in FIGS. 10B through 10G, a double line of the image data is inputted. The memory controller separates the image data into two lines of data and concurrently transfers the data to the SIMD-type processor 33. The SIMD-type processor 33 concurrently processes the two lines of the image data. The SIMD-type processor 33 concurrently outputs the processed image data. The memory controller A or any other memory controller outputs the two lines of the image data as they are through the image port.

The memory controller A outputs the two lines of the image data through the image port. In this case, it is preferred that the image data is transferred to the SIMD-type processor 33 in the right flow direction as indicated by a solid line from the image port of the upper left corner as shown in FIG. 10. The SIMD-type processor 33 outputs the processed data in the left flow direction as indicated by a dotted line to the image port. When the image port is one byte on eight-bit, two bytes or more, as long as the output or input uses one line of the image data, one line of the image data is inputted from the image port to the memory controller B for the data conversions as shown in FIGS. 1, 10A though 10F or to the memory controller C for the data flow as shown in FIG. 10G. The memory controller B separates the image data into two lines and concurrently outputs to the SIMD-type processor 33. The SIMD-type processor 33 concurrently processes the image data and outputs the two lines of the processed image data to the memory controller B, where the image data is combined into one line of the image data for output. In this case, the image data is outputted to the SIMD-type processor 33 from the upper right image port in the left data flow direction as shown in the dotted arrow lines Ar through Gr in FIG. 10. The SIMD-type processor 33 outputs the processed image data in the right data flow direction as indicated by the soled arrow lines Af through Gf. That is, one preferred embodiment the buffer memory device 32 according to the current invention selects and sets any one of the data flows as shown in FIGS. 10A though 10G, including the left-to-right data flow directions, the right-to-left data flow direction, the left-to-left via the SIMD-type processor data flow direction, and the right-to-right via the SIMD-type processor data flow direction. In the above data flows, the memory controllers A, B and C are optionally the same or they may be different. The line buffer memory of the RAM units D through 17 is placed at the input side or the output side of the memory controller as necessary.

Figure 4B:
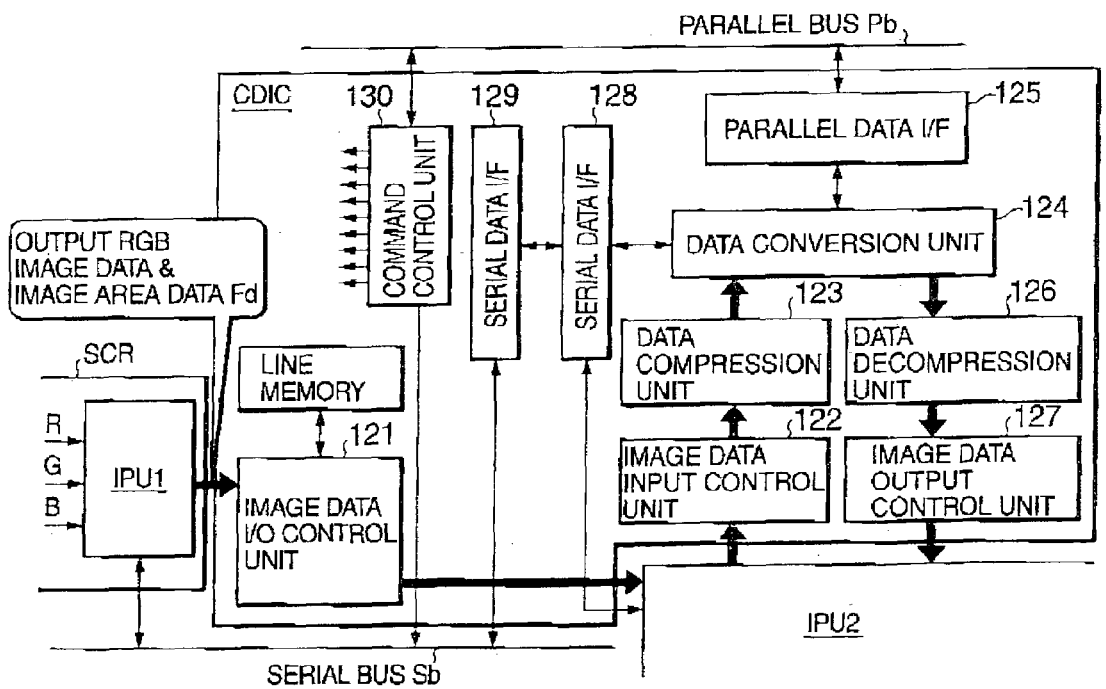
FIG. 4B is a diagram illustrating one preferred embodiment of the CDIC according to the current invention.

Referring to FIG. 4B, a diagram illustrates one preferred embodiment of the CDIC according to the current invention. The IPU 1 receives the RGB image data and the area data Fd, and the RGB image has been serially converted as shown in FIG. 9A. The IPU1 outputs the received data to the IPU2. The IPU2 performs the parallel-to-serial conversion as shown in FIG. 9B and separates the RGB data from the area data Fd. The IPU2 further generates 8-bit multi-value YMCK image data from the RGB data. When the image formation or print-out is specified, the parallel-to-serial conversion of FIG. 9C is performed and is outputted to the IPU3y, IPU3m, IPU3c and IPU3k. When it is specified to output to the parallel bus Pb, the parallel-to-serial conversion as shown in FIG. 9D is performed and is outputted to the image data input and output control 122 of the CDIC. The received data at the image data input output control 122 is compressed for the first time by the data compression unit 123 in order to increase the transfer rate in the parallel bus Pb. The data conversion unit 124 converts the compressed data into parallel data and outputs the parallel data to the parallel bus Pb via a parallel I/F 125. The image data from the parallel bus Pb is converted to serial data by the data conversion unit 124. Since the data has been initially compressed for the bus transfer, the data is decompressed by the data decompression unit 126. The decompressed data is the two-line serial data at the memory controller output as shown in FIG. 9D. The image data output control 127 outputs the decompressed data to the IPU2, where the image data is separated into the Y, M, C and K color image data by the parallel conversion. The CDIC has both conversion functions for the serial data from the parallel bus Pb and the serial data from the serial bus Sb. The system controller 10b transfers the data to the parallel bus Pb, while the process controllers 101 and 106 perform the parallel or serial conversion respectively at the data conversion unit 124 and the serial data I/F 129 for communication. The serial data I/F 129 is for IPU2, and the IPU2 serially transfers the image data.

Figure 11A:
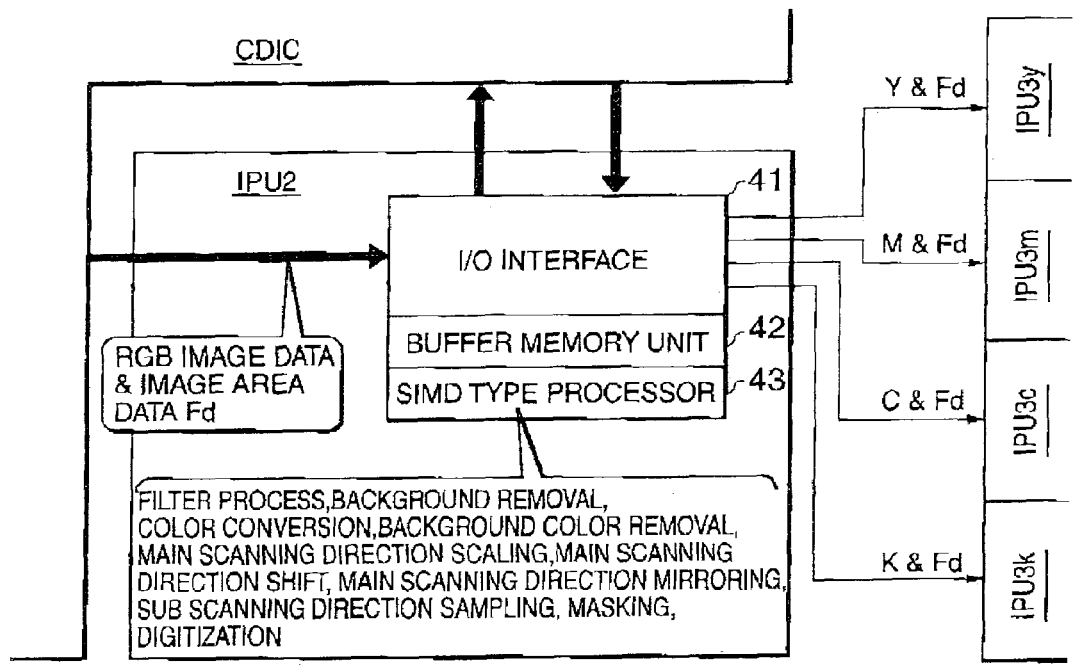
FIG. 11A is a diagram illustrating one preferred embodiment of the IPU2 according to the current invention.

Now referring to FIG. 11A, a diagram illustrates one preferred embodiment of the IPU2 according to the current invention. The IPU2 further includes an input/output I/F 41, a buffer memory 42 and a SIMD-type processor 33 and is a color image processing unit that combines the above components. The IPU2 has the substantially identical components 31, 32 and 33 of the IPU1 as shown in FIG. 5. However, in IPU2, the data stored in the program RAM and the data RAM in the SIMD-type processor 33 is intermediately processed for filtering, back ground removal, color conversion to YMCK, back ground color removal, scanning size change, scanning shift, scanning mirroring, subscanning sampling, masking and binarization for monochromatic character output.

Figure 11B:
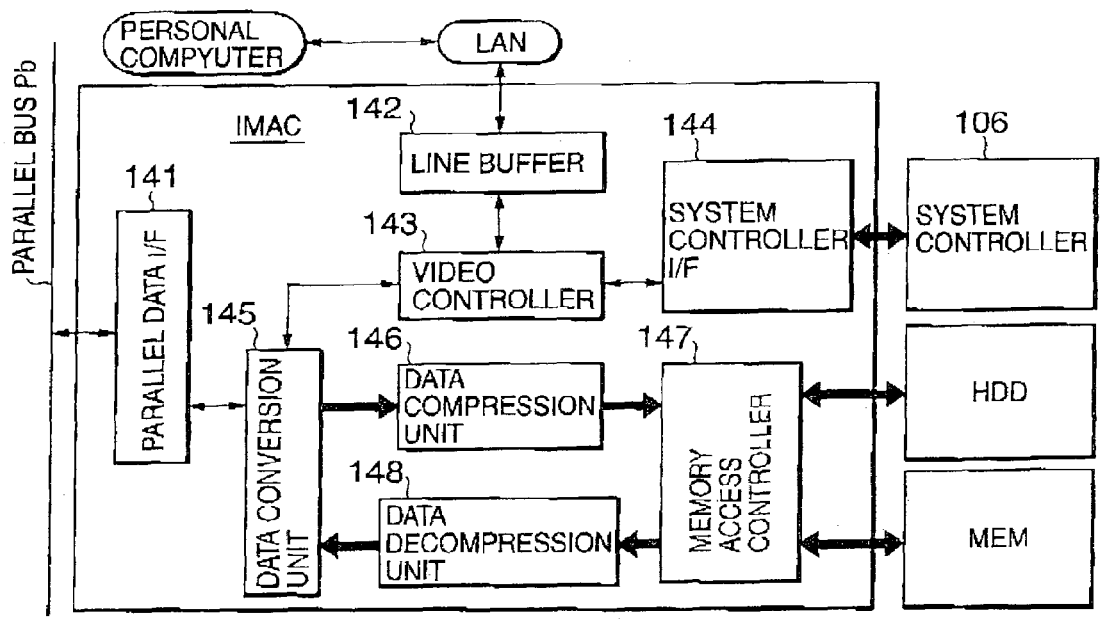
FIG. 11B is a diagram illustrating one preferred embodiment of the IMAC according to the current invention.

Now referring to FIG. 11B, a diagram illustrates one preferred embodiment of the IMAC according to the current invention. The parallel data I/F 141 manages the image data input and output for the parallel bus Pb. The parallel data I/F 141 further controls the write/read of the image data to and from the MEM unit and the formatting of the code data mainly from an external PC to the image data. The code data from the PC is stored in the line buffer 142. That is, it is locally stored in a local area, and the code data in the line buffer 142 is formatted into the image data by a video controller 143 based upon a formatting command from the system controller 106 that is inputted via the system controller I/F 144. The image data from the parallel bus Pb via the parallel data I/F 141 or the formatted image data is stored in the MEM. In this case, the data conversion unit 45 selects the image data to be stored. The data compression unit 46 compressed the image data for the second time to increase the memory utilization efficiency. The memory access controller 147 stores the secondarily compressed data in the MEM unit while the memory controller 147 manages the address for the storage. The memory access controller 147 manages the stored address for reading the stored data, and the data decompression unit 148 decompresses the read image data. The decompressed image data is still the initially compressed image data for the parallel bus transfer and is transferred to the parallel bus Pb via a parallel data I/F 141 for data transfer.

The facsimile control unit FCU for FAX transmissions as shown in FIG. 3 converts the image data to its transmission format and transmits to the external line circuit PN. The FCU also outputs to the image forming unit 105 via external I/F unit or the parallel bus Pb after converting the data from the external line circuit PN to the image data. The FCU further includes a FAX image process, an image memory, a memory control, a facsimile control unit, an image compression/decompression unit, a modem and a network control device. The IMAC or MEM covers a part of the buffer output function for the image data. In the FAX transmission/reception unit, the facsimile control unit FCU sends a command upon initiating the image information transfer and sequentially reads the stored image information from the image memory. The sequentially read image information is restored to the original signal by the FAX image process in the FCU. The density conversion or scaling are also performed, and the converted information is given to the facsimile control unit. The image information in the facsimile control unit is compressed by coding in the image compression unit and modulated by a modem for outputting to a destination via a network control device. The transmitted image information is removed from the memory. Upon reception, the received image is temporarily stored in the memory in the FCU. If the received image is ready for outputting for record, it is outputted upon receiving the information sufficient for one sheet of a recording medium.

Figure 12:
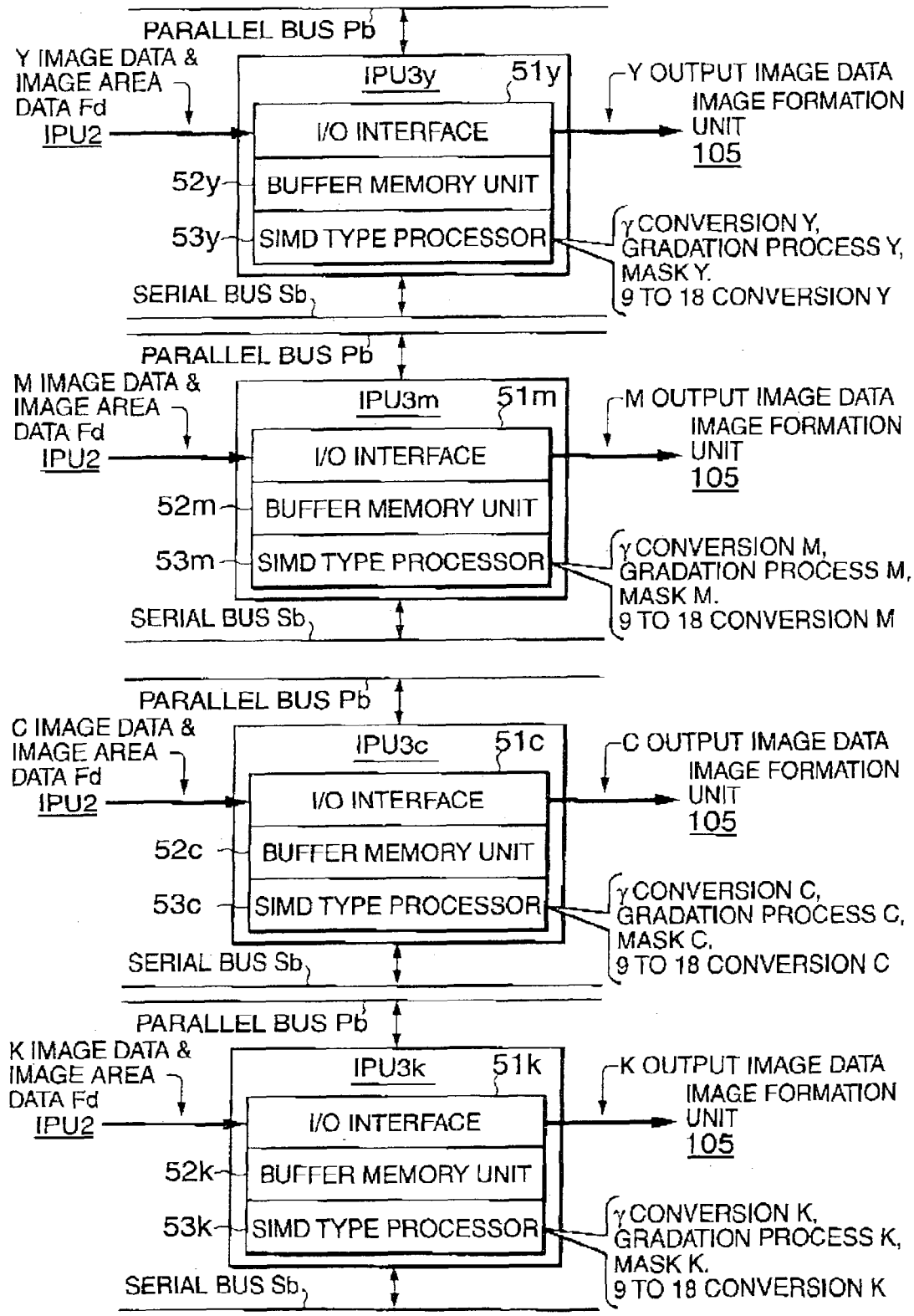
FIG. 12 is a diagram illustrating one preferred embodiment of the IPU3y, IPU3c, IPU3m and IPU3k according to the current invention.

Now referring to FIG. 12, a diagram illustrates one preferred embodiment of the IPU3y, IPU3c, IPU3m and IPU3k according to the current invention. The IPU3y, IPU3c, IPU3m and IPU3k are substantially identical with each other and perform the substantially identical output correction processes such as a printer γ conversion and a gradation process. In the following, IPU3y will be described in details. The IPU3y is a color image process unit that combines an input/output I/F 51y, a buffer memory 52y and a SIMD-type processor 53y. The IPU3y is substantially identical to the color image process unit of the IPU1, which includes the components 31, 32 and 33 as shown in FIG. 5. However, the data stored in the program RAM and the data RAM of the SIMD-type processor 33y is converted and binarized by gradation for a printer output in the IPU3y. The gradation generally includes intensity gradation process, a dithering process and an error diffusion process. Although one of these is selected based upon the image process mode or the area data Fd in the IPU3y, an error diffusion unit 35 is connected to the SIMD-type processor 53y as shown in FIG. 5. In FIG. 12, the above error diffusion unit 35 is not shown. The description of the IPU3c and the IPU3k will not be further provided since it is inferred by replacing the above description of Y(y) with M(m), C(c) or K(k). When the IPU3y, IPU3m IPU3c and IPU3k receive serial data including the area Fd from the output side of the memory controller as shown in FIG. 9C, the above units perform a reverse process of the parallel-to-serial conversion and the separation of the image data from the area data Fd. For example, the IPU3y performs the parallel conversion on a single line of serial data that alternates the Y image data and the area data Fd to generate a single line of only Y image data and a single line of only area data Fd. When the image data is concurrently received for the even-numbered pixel image data and the odd-numbered pixel image data, the IPU3y, IPU3c, IPU3m and IPU3k concurrently process the above two pixel image data. The two lines of the processed image data to be outputted to the image forming unit 105 is consolidated into a single line of serial data for a print output image data row as shown by the dotted line in FIG. 9E. The consolidated single line of the image data is outputted to the image forming unit 105. When the even-numbered and odd-numbered pixels are separately exposed by separate laser light or separate running line in the image forming unit 105, the two lines of the even-numbered pixel image data row and the odd-numbered pixel image data row are outputted to the image forming unit 105 without any further process. Although FIG. 9E indicates only the Bk image data that is processed by the IPU3k, the process is substantially the same for the Y, M and C image data. In the above example, the CDIC as an image data control means and the IMAC such as an image memory control means are connected by the parallel bus Pb. Since each of the stand alone color document scanner SCR, the second color image processing unit IPU2 and the color printer are not directly connected to the parallel bus Pb but connected to the CDIC or the IPU2, the CDIC and the IPU2 manages the utilization of the parallel bus Pb. For this reason, the mediation and the transfer control of the parallel bus Pb are facilitated and efficient.

Figure 13A:
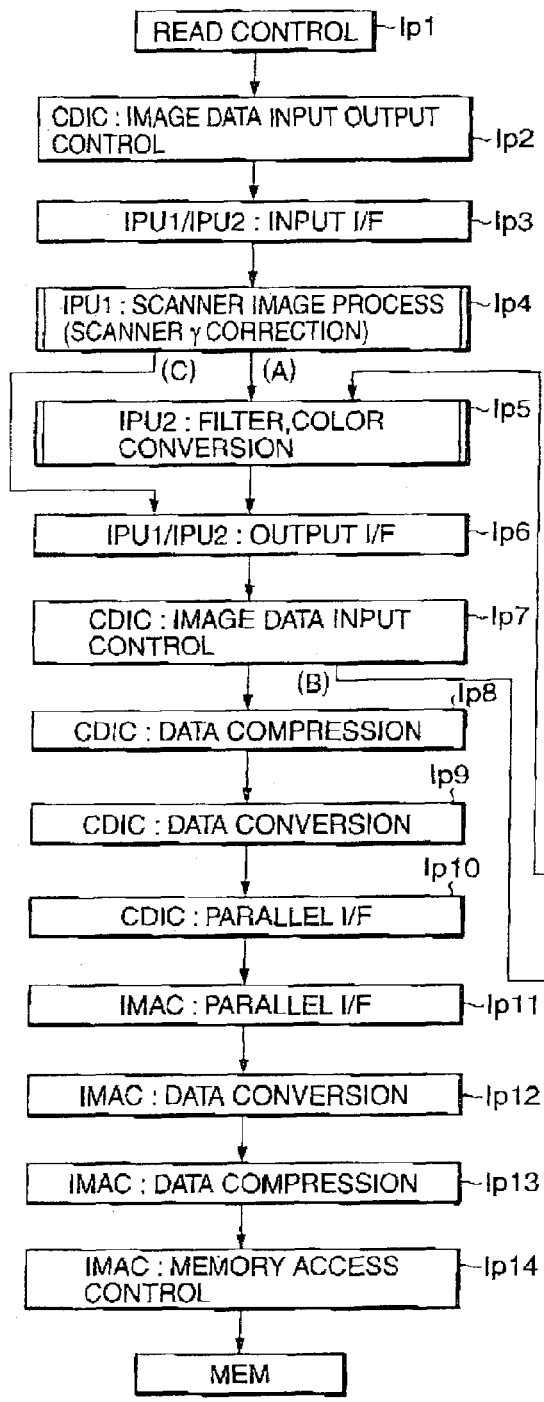
FIG. 13A is a flow chart illustrating steps Ip1 through Ip14 of writing in the MEM the YMCK image data that the IPU2 has converted or the RGB image data that the color document scanner SCR has generated.
Figure 13B:
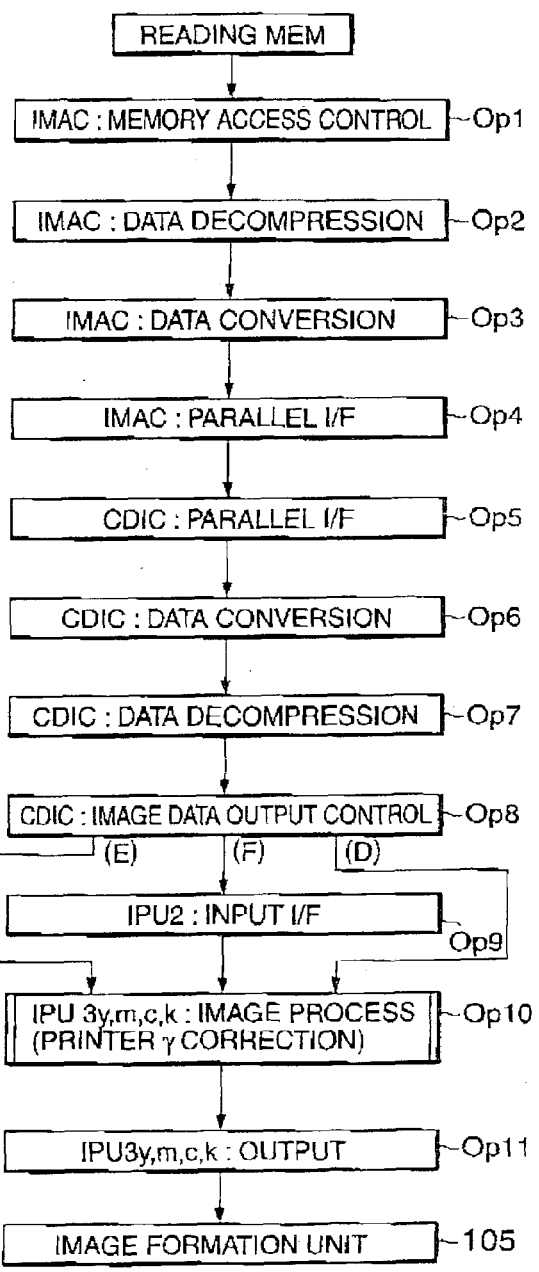
FIG. 13B is a flow chart illustrating steps Op1 through Op13 of outputting the image data read from the MEM to the image forming unit 105 of the color printer PTR and writing in the MEM the YMCK image data that has been converted from the RGB image data by the IPU2.

Now referring to FIGS. 13A and 13B, flow charts illustrate steps involved in a preferred process of storing and reading the image to and from the image memory MEM according to the current invention. FIG. 13a is a flow chart illustrating steps Ip1 through Ip14 of writing in the MEM the YMCK image data that the IPU2 has converted or the RGB image data that the color document scanner SCR has generated. FIG. 13B is a flow chart illustrating steps Op1 through Op13 of outputting the image data read from the MEM to the image forming unit 105 of the color printer PTR and writing in the MEM the YMCK image data that has been converted from the RGB image data by the IPU2. The CDIC controls the above data flows between the bus and the associated units. When the RGB data from the color document scanner is written to the MEM, the CDIC selects a route or path (A) for the steps Ip4 through Ip6. When the IPU2 converts the RGB image data from the color document scanner SCR into the YMCK image data and prints out the YMCK image data without processing, the CDID selects a path (B). Lastly, when the CDIC temporarily writes the YMCK image data of the IPU2 in the MEM, the CDIC selects a path (C) for the steps Ip4 and Ip5.

When the CDIC reads the YMCK image data from the MEM, the CDIC selects a path (D) for the steps Op8 through Op10. When the YMCK data is again rewritten to the MEM after the RGB image data is read and converted, the CDIC selects a path (E) for the steps Op8 through Op10. When the RGB data is read and printed out, the CDIC selects a path (F) for the steps Op8 and Op9. Among the above described RGB image data reading correction, the intermediate process including the conversion to the YMCK image data at the IPU2 and the output correction for the printer output at the IPU3y, IPU3c, IPU3m and IPU3k, an image process of the same kind is generally performed on the image data having pixels distributed over one line. Although the details are modified in the process in response to the area data Fd, if the area data Fd is the same, the same image process is performed. Therefore, a large number of processor elements PE increases the color image processing speed in all of the above reading correction process, the intermediate process and the output correction process by performing the same image process concurrently on each of the multi-value color image data using the SIMD-type processors 33, 43, 53y, 53m, 53c and 53k in the color image process unit IPU1 through IPU3. The SIMD-type processors 33, 43, 53y, 53m, 53c and 53k each have a total of 320 processor elements PE, which each process more than 8-bit of multi-value image data and concurrently process image data for 320 pixels. For example, a matrix used in a dithering process has a size of 4×4, 6×6, 8×8 or 16×16. To be applicable to any one of these matrixes and to concurrently process a plurality of the matrixes in parallel, a multiple of a minimal common multiple number of ninty-six of processor elements is necessary since eight is a quotient of a number sixteen. In the preferred embodiment, three hundred twenty processor elements are used since an offset of 32 is added to 96×3. When 96×3 pixel groups of image data are processed, the offset is used for intermediate computation, image data keeping or supplying computation or for referencing the image pixel group at both sides of the rear pixel image data.

In the matrix where a plurality of pixels exists in two dimensional directions from a current pixel, when a filtering process such as edge emphasis or smoothing known as MTF correction is performed on the image data of the current pixel or when an edge detection of the current pixel by comparing the matrix image data distribution to the edge pattern matrix, it is necessary to provide the performing element with the result of the sum of the product or a pattern comparison. The sum of the product or a pattern comparison is performed by the image group data of adjacent pixels in both sides of 96×3 pixel groups as well as an offset of sixteen processor elements at both sides of the 96×3 performing processor elements for outputting the computational data. Thus, depending upon an image process, more than 96×3 processor elements are used for the concurrently parallel image data processes. For the interpolation of linear approximation for generating the above described γ-conversion LUT, since the adjacent pixels for the image data are not needed for reference in interpolating the current pixel, all of the three hundred twenty processor elements PE are used for the concurrent interpolation computation of the image data of the three hundred twenty pixels. However, the color image data for the γ-conversion is 8-bit multi-gradation data. Since it is interpolation of 256-gradation data ranging from 0 to 255, all of the two hundred fifty-six processor elements PE are used concurrently. For example, when a number of multi-gradation data exceeds 320, 512, 1024 or 2048 pieces of 9, 10, 11 or 12 bit, gradation data is used. For example, when 512 pieces of gradation data is used, the first 319 pieces of the multi-gradation group data is interpolated all at once, and the γ-converted results are written to the γ-conversion LUT RAM. Subsequently, the remaining $320^{th}$ to $511^{th}$ pieces of multi-gradation data is interpolated at once, and the γ-converted results are written to the γ-conversion LUT RAM. In other words, the γ-conversion by interpolation is repeated for a number of times.

The LUT generation will be described. The LUT is used for γ-conversion in numerous image processes which the same process is concurrently performed on a large number of image data by the IPU2 or the IPU3y, IPU3c, IPU3m and IPU3k. For example, the scanner γ-conversion is performed in the IPU 1 while the printer γ-conversion is performed in the IPU3y, IPU3c, IPU3m and IPU3k. The image processing program or data is contained in a hard disk HDD, and the image processing program or data is respectively loaded in the program RAM and the data RAM of the SIMD-type processor 33, 43, 53y, 53m, 53c and 53k. When the system controller 106 initializes the system in response to power on or a reset signal from the operation board OPB or a host PC, the above described program and data in the hard disk HDD are designated for each of the processors 33, 43, 53y, 53m, 53c and 53k and are loaded to the above designations by the data transfer via the IMAC, the parallel bus Pb, the CDIC, the serial bus 5b and the process controller 101.

Figure 14:
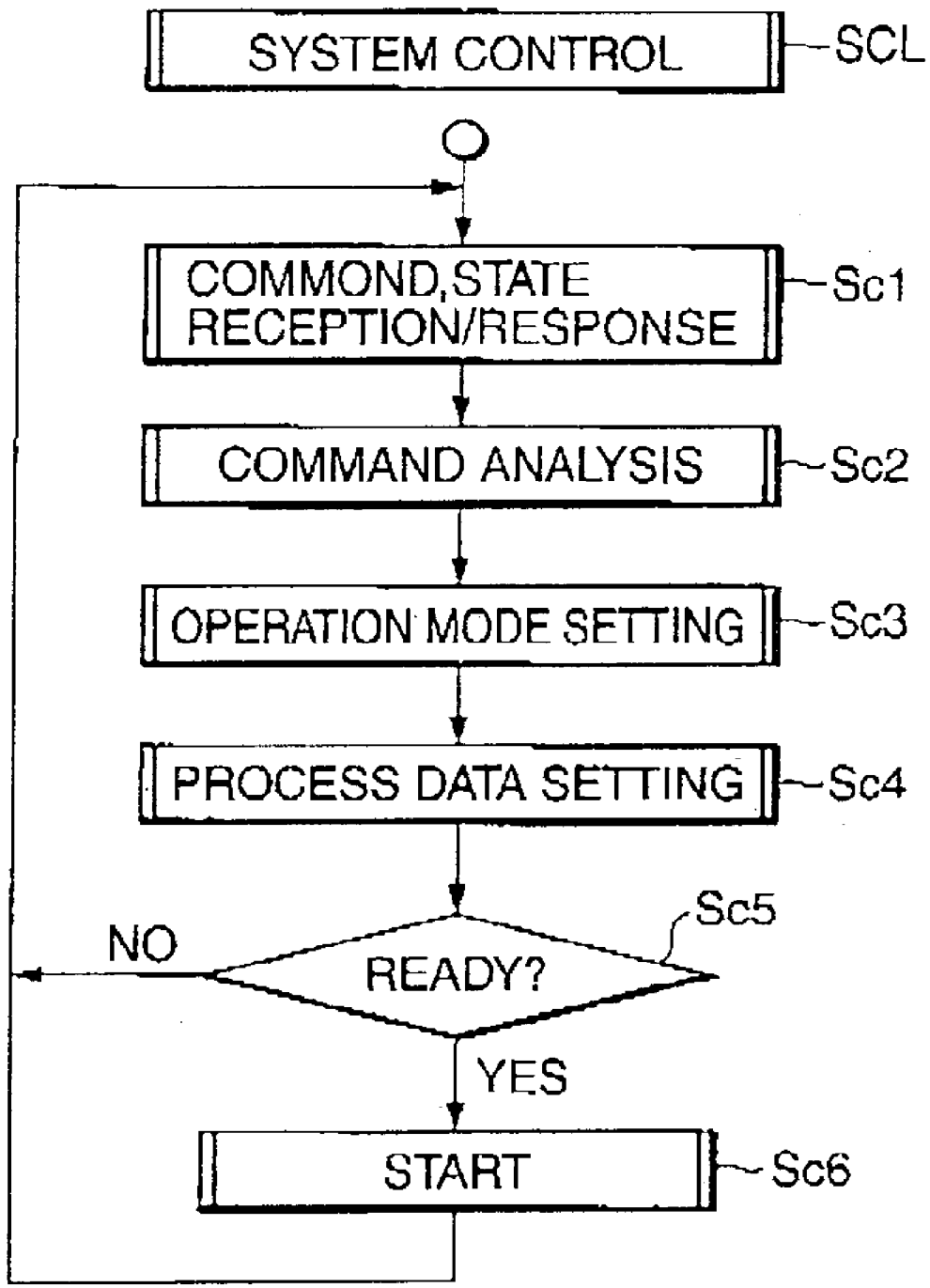
FIG. 14 is a flow chart illustrating steps involved in a preferred process of setting the system according to the current invention.

Now referring to FIG. 14, a flow chart illustrates steps involved in a preferred process of setting the system according to the current invention. The system controller 106 sets the system in response to an image processing instruction from a host PC or the operation board POB. Among the system controller 106, the operation board OPB, the personal computer PC, the facsimile control unit FCU, the color document scanner SCR and the color printer PTR, a command, a response and state information are exchanged. In a step Sc1, a command or an instruction for image processing is received from the operation board OPB, the personal computer PC or the facsimile control unit FCU. The received command is analyzed in a step Sc2, where the command data is decoded. Subsequently, the system controller 106 determines an operation mode for each element or component in the system as shown in FIG. 3 based upon the command analysis result in a step Sc3. The corresponding image processing data for the operation mode is transferred in a step Sc4. The system components each set the received operation mode and the received image processing data for themselves. If the specified command is ready to be performed by the system component, the system component sends a ready signal to the system controller 106. When the system controller 106 determines that all of the components related to the specified operation mode are ready in a step Sc5, the system controller 106 instructs each of the above system components to initiate the image process in a step Sc6.

Figure 15:
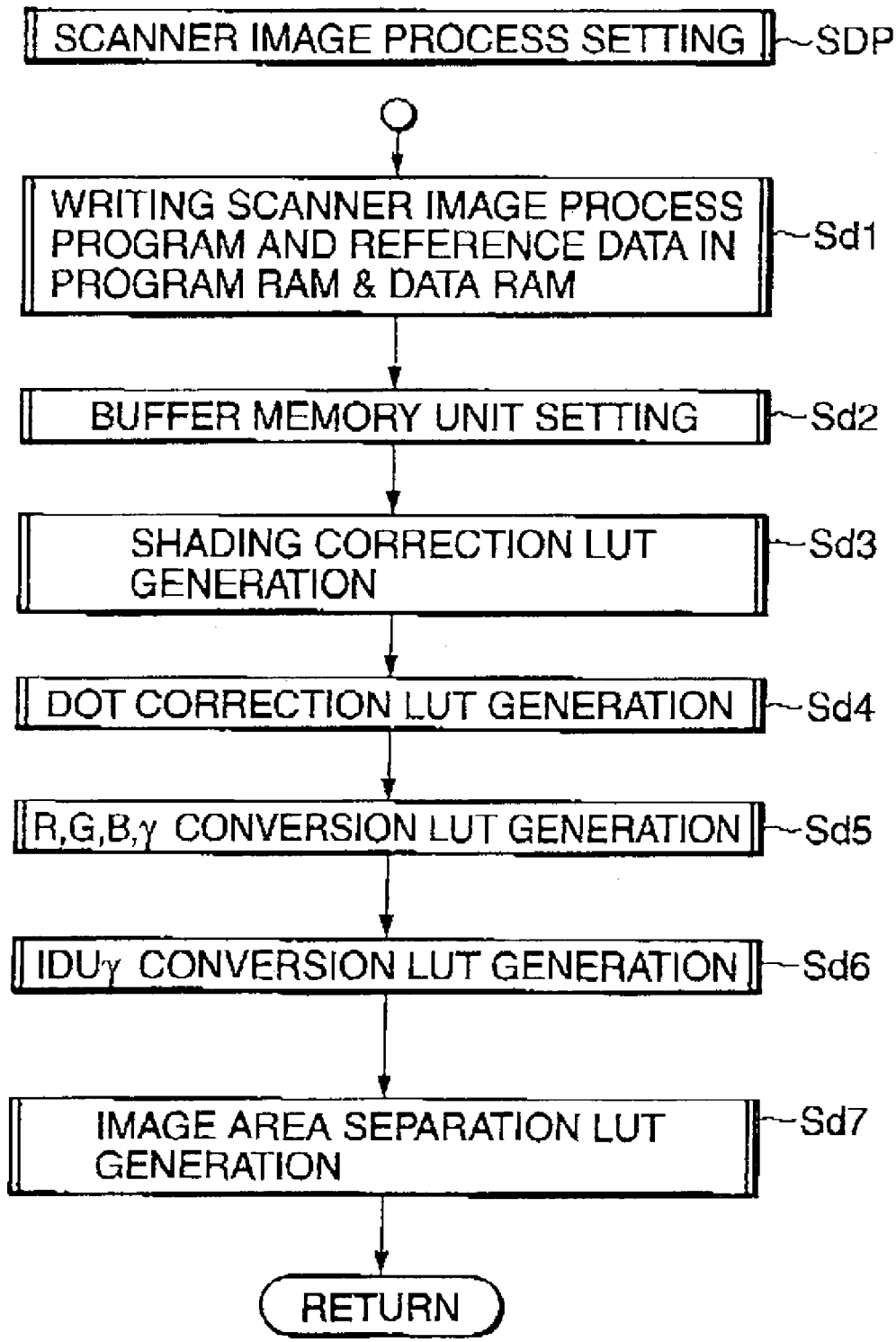
FIG. 15 is a flow chart illustrating steps involved in a preferred process of initializing the SIMD-type processor 33 in the IPU according to the current invention.

Now referring to FIG. 15, a flow chart illustrates steps involved in a preferred process of initializing the SIMD-type processor 33 in the IPU according to the current invention. When the system controller 106 instructs the initialization, the SIMD type processor 33 in the IPU1 receives the transfer addresses for the image processing program and the image data in the hard disk HDD as well as the down load instructions. The DMAC of the external I/F39 in the SIMD-type processor 33 writes the address specified program in the program RAM 36 and the image process data in the data RAM 37 in a step Sd1. After the above program and data transfer, the SIMD-type processor 33 performs according to the initialization program in the program RAM 33 the following steps. In a step Sd2, the buffer memory device 32 is initialized. In a step Sd3, a LUT is generated for shading correction. In a step Sd4, a LUT is generated for dot correction. In a step Sd5, a LUT is generated for γ conversion for each of the R, G and B color components. In a step Sd6, a LUT is generated for IDU γ conversion. In a step Sd7, various LUT's are generated for area separations. Upon completing the generation of the above LUT's, a ready signal is generated. In details, the buffer memory device 32 in the step Sd2 sets the control functions of twenty memory controllers 0 through 19 as shown in FIG. 5 according to the memory controllers and memory allocations in the initialization program as well as sixteen RAM's 0 through 15 and two RAM's 16, 17 for use allocations. The main use includes an input line buffer for temporarily storing the input image data, an output line buffer for temporarily storing the output image data, an intermediate line buffer for temporarily storing the image data in process, LUT or data delay or delay memory for synchronization. The control function for the memory controller is the RAM access control.

The above settings are implemented by outputting to a corresponding memory controller the management information for the RAM 0 through 17 contained in the setting information and the memory controller setting information for twenty memory controllers as shown in FIG. 5. The global processor 38 of the SIMD-type processor 33 reads the memory controller setting information and the management information from the data RAM 37 and writes the above information in the memory controller setting register and the buffer memory management register in the global processor 38 prior to outputting to the corresponding memory controller.

The initialization information in the memory controller setting information is read from the data RAM 37 by the SIMD-type processor 33 based upon the initialization program and is written to the memory controller setting register and the buffer memory management register. Subsequently, upon initiating the image processing, the memory controller setting information and the RAM management information are updated as the image process progresses. For example, in RAMS as specified by the input line buffer for controlling read/write of data, "write" is contained at the timing for the input image data, but "read" is contained after the write is completed and at the timing for reading a predetermined number of the image data for image processing.

Now referring to FIG. 16A, a diagram illustrates exemplary memory allocation for the memory controller setting information in a memory controller setting register to be used in the current invention. Similarly, FIG. 16C illustrates exemplary memory allocation for buffer memory management to be used in the current invention. The memory controller setting register and the buffer memory management register is a pair, and a plurality of the pairs is written in the data RAM from the hard disk HDD. Each pair corresponds to the data processing mode of the IPU1, and a pair of the global processors 38 corresponding to the data processing mode reads and outputs to the corresponding memory controller each of the memory controller setting information and the linked buffer memory management information. FIG. 16B illustrates one major item of the memory controller setting information in the memory controller setting register. The major item includes a transfer mode, From (data transmission source element ID), To (data reception source ID) and a control mode. Major transfer mode values include the following:

(TM1) Storing image port input data in buffer RAM's 0 through 17;
(TM2) Direct transmitting image port input data to processor elements PE in the SIMD-type processor 33;
(TM3) Transmitting to the processor elements PE from RAM's 0 through 17;
(TM4) Outputting to buffer RAM's 0 through 17 from the processor elements PE;
(TM5) Direct outputting to image port for the processor element PE;
(TM6) Outputting to image port from buffer RAM's 0 through 17;
(TM7) Outputting to the address line of RAM's 0 through 17 setting LUT image port input data;
(TM8) Outputting to RAM's 0 through 17 setting LUT image data in buffer RAM's 0 through 17;
(TM9) Outputting to the processor elements PE reading data in RAM's 0 through 17 setting LUT;
(TM10) Storing in buffer RAM's 0 through 17 reading data in RAM's 0 through 17 setting LUT; and
(TM11) Outputting to image port reading data in RAM's 0 through 17 setting LUT.

In the From item, the following information is written: a data output port a transmission source element including image ports, RAM's 0 through 17 and processor elements No. 0 through 17 n–1 of SIMD-type processor 33. In the To item, the following information is written: on data image ports, RAM's 0 through 17 and processor elements No. 0 through n–1 of SIMD-type processor 33.

The control mode has the following major values:
(CM1) Master transfer 1 (direction transfer between image ports 0 through 4 and processor elements PE);
(CM2) Master transfer 2 (writing RAM's 0 through RAM's 17);
(CM3) Master transfer 3 (reading RAM 0 through RAM 17);
(CM4) Line divided block transfer 1 (reading from RAM0'S 0 through 17);

(CM5) Line divided block transfer 2 (writing to RAM'S 0 through 17);
(CM6) Odd/even consolidation; and
(CM7) Odd/even separation.

One of eighteen RAM'S 0 through 17 as shown in FIG. 5 is specified as a line buffer for inputting image data, and the memory controller is specified for reading and writing in the above line buffer. To write input image data, the global processor 38 of the SIMD-type processor 33 provides the memory controller 0 with the following setting information and management information read from the RAM'S 36 and 37:

| Setting information | |
|---|---|
| Transfer mode: | the above (TM1) |
| From: | the first input port of the image port 0 |
| To: | RAM 0 |
| Control mode: | the above (CM1) |
| Management Information | |
| Starting Address: | Ex O |
| Ending Address: | Ex 204T |
| Use mode: | buffer memory |

The memory controller O sets the data selector of the memory switch SW1 to be "writing" data from the memory controller O to RAM O based upon the above information. The memory controller O serially arrives at the first input port of the image port O in the raster scanning and writes one line or 2048 pixels of 8-bit/pixel image data in RAM O. The specified writing area is from the beginning address to the ending address. After writing in RAM O, when less then one line of but a predetermined number of the image data is read from th-+e RAM O and is outputted to the processor elements No. o-k, the SIMD-type processor 33, the global processor 38 of the SIMD-type processor 33 initially provides the memory controller O with the following setting information:

| The setting information: | |
|---|---|
| Transfer mode: | the above (TM 3) |
| From: | RAM O |
| To: | Processor Element No. o |
| Control mode: | the above (CM 4) |
| Management information: | |
| Starting address: | (Ex: 0) |
| Ending address: | (Ex: 7) |
| Use mode: | buffer memory |

Figure 8:
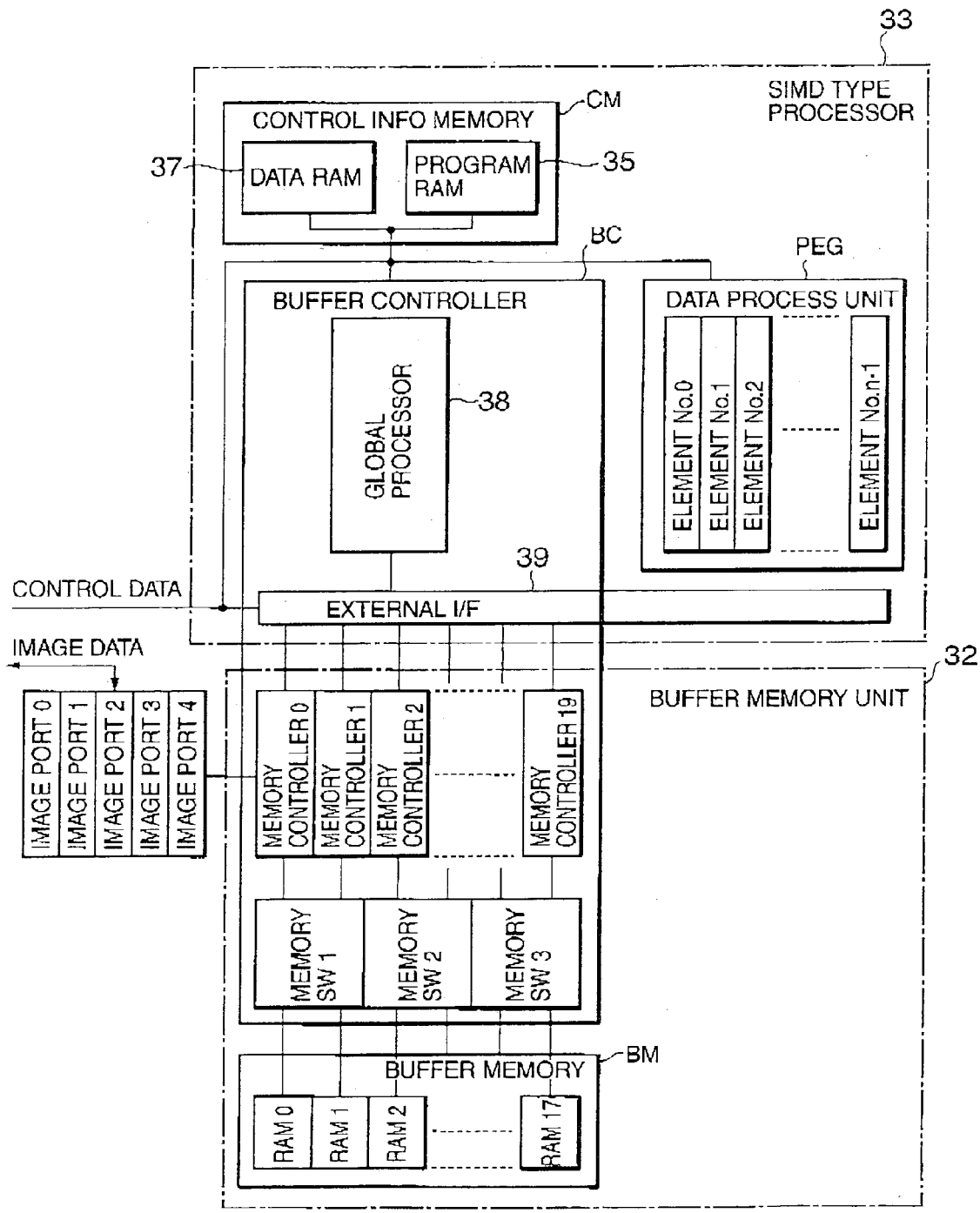
FIG. 8 is a diagram of one preferred embodiment illustrating the data conversion device which combines the SIMD-type processor 33 and the buffer memory 32 of FIG. 5 according to the current invention.

The memory controller O sets the data selector of the memory switch SW1 to be "decoding" data form RAM O to the memory controller O based upon the above information. That is, the image data from the starting address (0) to the ending address (7) is serially read and inputted to the processor element No. o. The reading area is from the beginning address to the ending address. The global processor 38 sequentially provides with the processor element No. o through k a block of predetermined number such as eight of the image data by adding eight to the address and by incrementing the processor element number. The control mode is set to the above (CM 3) while the beginning ad ending addresses are respectively set to 0 and 2047 of one line. To is also set to the image port 4. In the above settings, one line of the image data is serially outputted to the image port 4 in a raster scanning fashion. By combining the above block transfer to the SIMD-type processor 33 via the memory controller o and another block transfer using another RAM and memory controller, image data is inputted to the SIMD-type processor 33 in an image data group in a plurality of pixel matrixes in a main and sub scanning directions. In the above manner, for example each RAM 0 through 17 is assigned to a memory controller, and each block of the image data for each line is transferred to all of the processor elements No. o through k fro each of the memory controllers. In another manner, each memory controller o through k is assigned to each processor element o through k, and each block of the image data group is sequentially read and transferred to each processor element o through k from a plurality of the RAMs at each memory controller. That is, there are three manners for the data transfer between the buffer memory and the data processor device PEG. The three manners include the above first manner in which each memory RAM o through 17 is assigned to each memory controller, the above second manner in which each processor element PE is assigned to each memory controller and a combination of the first manner and the second manner. For example, when a 3xe pixel matrix of the image data is inputted to the processor element No. o through k of the SIMD-type processor 33, after the image data from each line of the lines 1 through 3 is written to the RAM's 0 through 2, the block transfer is set with the beginning address 0, the ending address 2 and to processor element No. o in the order of the memory controller 0(RAM O), the memory controller 1 (RAM 1) and the memory controller 2 (RAM 2). The three pixel image data from the RAM 0 through 2 is read and written to the processor element No. o. That is, one set of 3×3 image data that has one current pixel in the center is written. When the image data in a next 3×3 pixel matrix is similarly read and written, the block transfer is set with the beginning address 1, and the ending address 3 and the processor element No. 1 in order of the memory controller 0 (RAM 2), the memory controller 1 (RAM 1) and the memory controller 2 (RAM 2), each three pixel image data is read from the RAMs 0 through 2 and is written to the processor element No. 1. The beginning address is incremented by one, and the To value is sequentially charged to a next processor No. Each pixel in one line is sequentially designated a current pixel, and a 3×3 pixel matrix of the image group is made with the current pixel in the caster of the matrix. The 3×3 matrix image group is than sequentially outputted to the SIMD-type processor 33. Based upon LUT data computational program in the RAM's 36 and 37 of the SIMD-type processor, the data processing device PEG computes LUT data for γ converting 8-bit 256-gradation image data. The RAMs 36-37 are control information memory CM as shown in FIG. 8. As shown in FIG. 5, when LUT is generated and written in one of eighteen RAMs 0 through 17 such as RAM 6 at an address A through A+255, the global processor 38 provides the memory controller 6 with the following setting information and management information that are read from the RAM 36 or 37 of the SIMD-type processor 33. The RAM 36 or 37 is control information memory as shown in FIG. 8.

| The Setting Information: | |
|---|---|
| Transfer mode: | The above (TM 4) |
| From: | Data processing |
| To: | RAM 6 processing device PEG (PE Group) |
| Control: | The above (CM 1) |

-continued

| The Management Information: | |
|---|---|
| The Beginning Address: | A |
| The Ending Address: | A+255 |
| Use Mode: | LUT (write) |

The memory controller 6 sets "data write" in the data selector of the memory switch SW2 for writing from the memory controller 6 to RAM 6. The memory controller 6 writes each LUT data from each PE of the data processing device PE from the beginning address A to the ending Address A+255 in the RAM 6. When the even-numbered pixel image data and the odd-numbered image data are concurrently γ-converted; the following information is set:

| Setting information | |
|---|---|
| Transfer Mode: | the above (TM10) |
| From: | RAM 6 |
| To: | RAM 7 |
| Control Mode: | the above (CM3) |
| Management Information | |
| Beginning Address: | A |
| Ending Address: | A+255 |
| USE Mode: | LUT (write) |

The LUT in the RAM 6 is transferred or copied to the RAM 3. For example, while the Ram 6 is set for the γ conversion of the odd-numbered pixel image data, the RAM 7 is set for the γ-conversion of the even-numbered pixel image data.

When the LUT in the RAM 6 is used for the gamma conversion of the image data, the memory controller 4 is set with the following exemplary information:

| Setting information | |
|---|---|
| Transfer Mode: | the above (TM7) |
| From: | Image Port 2 |
| To: | RAM 6 |
| Control Mode: | the above (CM3) |
| Management Information | |
| Beginning Address: | A |
| Ending Address: | A+255 |
| USE Mode: | LUT (read) |

With the above settings, the image data arrived in the image port 2 is converted at the beginning address A and the ending address A+255 in the RAM 6 and is given to the address bus of the RAM 6. The data read from the RAM 6 is the γ-conversion data. The image data arrived in the image port is temporarily stored in a RAM such as the RAM 4 and is optionally converted to address data for accessing the RAM 6. In this case, the memory controller 4 is used for writing the image in the RAM 4 while the memory controller 6 is used for transferring image data read from the RAM 6. The transfer of the γ-converted data from the Ram 2 has the transfer mode (TM9), (TM10) or (TM11). For example the memory controller 6 is used, and the γ-converted image data is transferred to the data processing device PEG, another RAM such as the RAM 8 or the image port 2. When the odd-numbered pixel image data and the odd-numbered pixel image data are concurrently γ-converted, the LUT of the RAM 6 is used for the γ-conversion of the odd-numbered pixel image data. Similarly, the LUT in the RAM 7, the memory controller 5, RAM 5, the memory controller 7 and the RAM 9 is used.

The SIMD-type processor 33 additionally uses the above setting information and the management information for the data consolidation and separation as shown in FIG. 9, and the RAMs 0 through 17 are used for the LUT. One area of each RAM is used as a one-line buffer for inputting and outputting the image data while another area of the RAMs is used for LUT. However, the use or access to the line buffer and the LUT is time-divided or accessed at a different time.

When the date consolidation as shown in FIG. 9A, 9C or 9D is performed, from in the above setting information is used twice. The control mode is the above (CM6) for the odd number/even number consolidation. In this case, the above memory controller with the specified process determines an odd-numbered timing and an even-numbered timing based upon the pixel synchronization pulse and ½ frequency pulse. The above memory controller outputs the image data from one of the two "From" specified addresses at the odd-number pixel timing to the "To" address. On the other hand, the memory controller outputs the image data from the other specified address at the even-numbered pixel timing to the "To" address.

When the data separation as shown in FIGURE B is performed, to in the above setting information is two places, and the above control mode is the odd/even consolidation of the above (CM7). In this case, the memory controller specifying this process determines the odd-number timing and the even-number timing based upon the pixel synchronization pulse and the ½ frequency pulse. At the odd-number pixel timing the image data from the From is outputted to one of the two addresses in To while the other image data is outputted to the other address at the even-numbered pixel timing. In the above example, the area and function specifications of each memory RAM 0 through 17 in the buffer memory BM includes the beginning address, the end address and the use mode (data buffer/LUT) for each area as shown in FIG. 16D. That is, the memory management information data in the control information data includes the beginning address, the end address and the use mode.

Another example is that the memory management information in the control information data is characteristic information to determine whether a functional area is an original buffer area or another functional area. The above functional area is the LUT area defined by a beginning address and an ending address. For example, if all of the memory RAMs 0 through 17 are used as a data buffer, the beginning and ending addresses for the use are contained in the memory management information. However, the characteristic column is left blank in the initialization stage. On the other hand, if a partial or whole area of the memory RAMs 0 through 17 is used as LUT or non-data-buffer, the beginning and ending address as well as characteristic information indicative of functional switch are contained in the management information. When a data buffer area, a LUT area or another data buffer area are sequentially defined in the above sequence, the data buffer area management information includes the first and second addresses with blank characteristic information while the second LUT area and the third original data buffer area both include the beginning address, the ending address and the characteristic information indicative of a functional change. The memory area function is initially assumed to be a data buffer. The areas until the characteristic information are automatically designated as a data buffer. When the characteristic information indicative of a functional switch appears, the corresponding area is designated as a LUT or non-data-buffer function, and its characteristic information is reset to designate a data buffer.

Now referring to FIGS. 17A through 17F, diagrams illustrate the use of the RAMs 0 through 17 in the current invention. FIG. 17A illustrates a data read write area in one of the RAMs 0 through 17 when the one RAM is used as a line buffer for one line of image data for a short side of the A3 size output image. The line buffer memory functions as an input buffer an intermediate buffer or an output buffer. FIG. 17B illustrates two-line buffer for one line of image data for a short side of the A4 size output. FIG. 17C illustrates a one-line buffer for the A3 size output and a LUT. FIG. 17D illustrates a single LUT while FIG. 17E illustrates seven LUTs. For example, each of the seven LUTs is for a single color component, and depending upon the area separation result and based upon the operation board or instructions from a personal computer, one of the LUT is selected in real time. FIG. 17F illustrates LUTs read from the HDD or the LUTs generated by the SIMD-type processors 33 in a part of the RAMs 0 through 17 that is used as a temporary storage. For example, the SIMD-type processor 33 generates and store three LUT 10, LUT11, and LUT12 for the γ conversion of the RGB image data. At the time of the RGB γ-conversion, the LUT10 for the R image data is copied into two RAMs from 1 through 17, and the odd-numbered pixel R image data and the even-numbered pixel R image data are concurrently γ-converted using the two LUTs. Similarly, the G image data and the B image data are processed in the described manner. FIG. 15 shows the generation of dot LUT (Sd4), each γ-conversion LUT for R, G and B (Sd5), an IDU γ conversion LUT (Sd6) and an area separation LUT (Sd7). FIG. 14 shows that the SIMD-type processor 33 is activated and updates the corresponding LUT for the specified data in the instruction from the system controller 106 when the operation board OPD or the personal computer PC commands the LUT change or adjustment for the system control SCL. The generation of the γ-conversion LUT is performed by the IPU1 for the G and B (Sd5) and by IPU3y, IPU3m, IPU3c and IPU3 for Y, M, C and K. The reading correction program for the IPU1 in the hard disk includes the storage address for the scanner γ conversion program at the γ conversion location. For example, as shown in FIG. 18, the storage address is SIR, SIG and SIB in the first group. When the reading correction program is transferred to the program RAM 36 for the SIMD-type processor 33 of the IPU 1 from the hard disk HDD, the R, G and B scanner γ-conversion program address is transferred by replacing the storage address of the reading correction program. After transferring to the program RAM 36, when the program in the program RAM 36 gives an update command to the system controller 106 in response to the host PC or the operation OPB, other groups such as 52R, 53G and 53B are updated or replaced. Similarly, the outputting correction program includes the storage address of the Y, M, C and K printer γ-conversion program at the γ conversion location. When the Y, M, C, and K output correction programs are transferred to each of the program RAM of the processors 53y, 53m, 53c and 53k of the IPU3y, IPU3m, IPU3c and IPU3k, the printer γ conversion program address are replaced by the storage addresses. Even after transferring to each program RAM, the address is optionally rewritten by those of the other groups such as P3Y, P3M, P3C and P3K as shown in FIG. 18 by the operation board or the PC. The generation of γ-conversion LUT by the interpolation computation program will be described.

Figure 20:
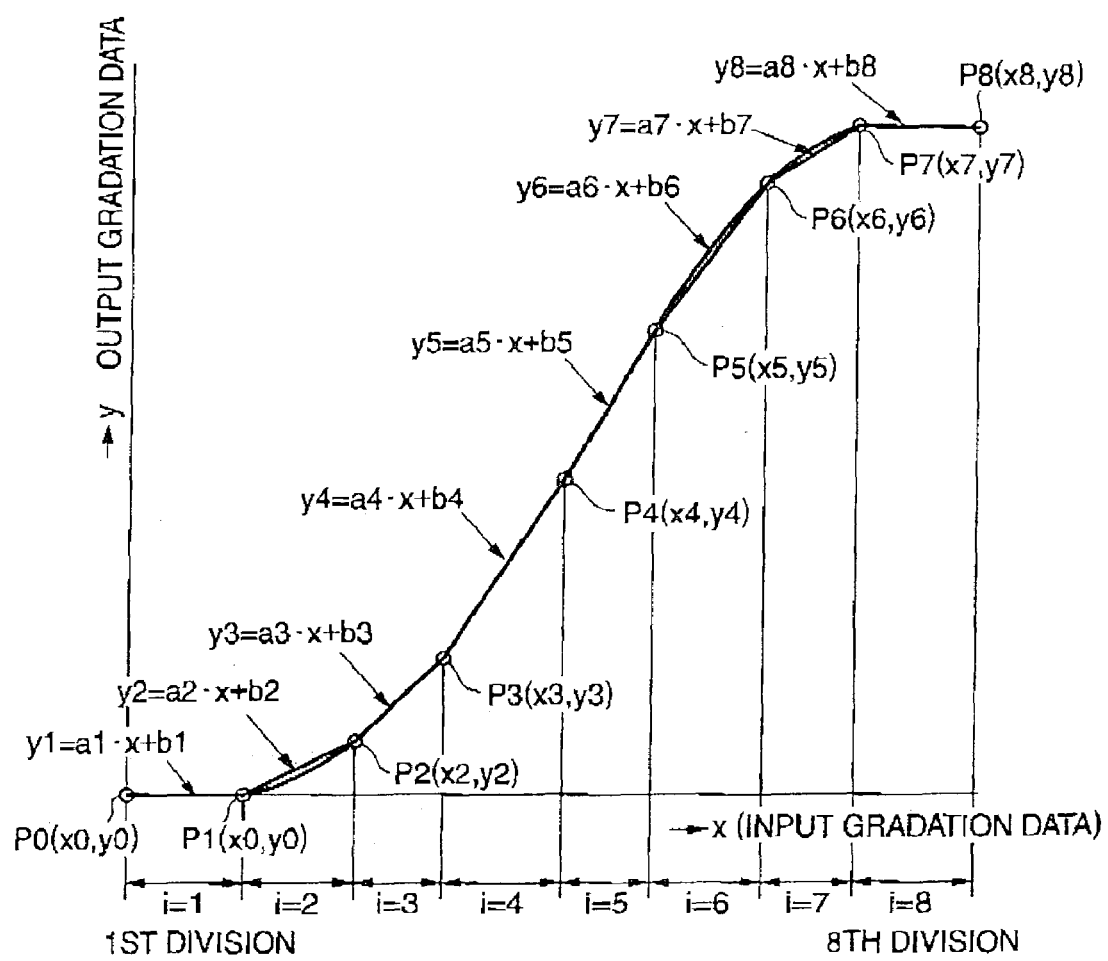
FIG. 20 is a graph showing a relation between the input and output gradation data in one preferred embodiment according to the current invention.

Now referring to FIG. 20, a graph shows a relation between the input and output gradation data in one preferred embodiment according to the current invention. In the preferred embodiment, the input image data X is converted to the output image data y in a S-shape characteristics as indicated by a dotted line by the γ-conversion of the RGB image data at the IPU1 form the reading unit 21 and the γ-conversion of the YMCK image at IPU3y, IPU3m, IPU3c and IPU3k from the IPU2. 8-bit input image data X from 0 to 255 is divided into eight ranges, and each range of the conversion characteristic curve is approximated by a solid line as shown in FIG. 20. By the interpolation of the linear approximation using the equation, each of the gradation data 0-255 is γ-converted. The application division of the interpolation equation is shown as follows:

| Division No. | Boundary Value | Computation Equation |
|---|---|---|
| 1 | x1 | y1 = a1 · x + b1 |
| 2 | x2 | y2 = a2 · x + b2 |
| 3 | x3 | y3 = a3 · x + b3 |
| 4 | x4 | y4 = a4 · x + b4 |
| 5 | x5 | y5 = a5 · x + b5 |
| 6 | x6 | y6 = a6 · x + b6 |
| 7 | x7 | y7 = a7 · x + b7 |
| 8 | (x8: unnecessary) | y8 = a8 · x + b8 |

Figure 19:
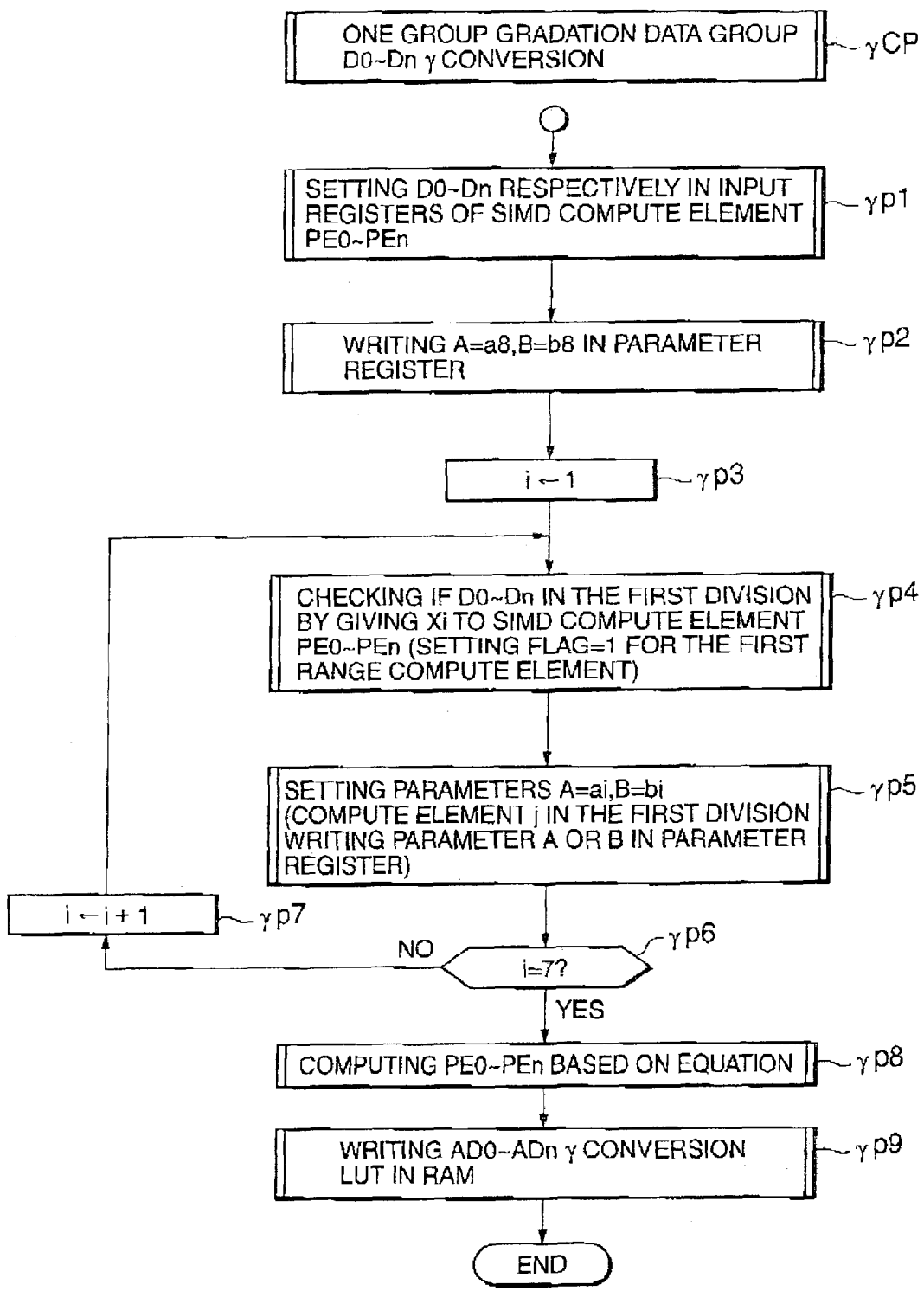
FIG. 19 is the concurrent γ-conversion showing n+1 (n=255) or the two hundred fifty-six gradation data by the global processor 38 according to the conversion program in the program RAM 36 of the SIMD-type processors 33, 53y, 53m, 53c and 53k a the IPU1, IPU3y, IPU3m, IPU3c and IPU3k.

Furthermore, at the boundary between adjacent divisions, the computational equation in both divisions is continuous. For example, in y1=a1.x+b1 and y2=a2.x+b2, when x is replaced by x1, y1=y2. That is, y1=a1.x1+b1=a2.x1+b 2+y2. The boundary value is xi(xi-x8), ai(ai-a8) is a slope, an interpolation computation parameter, and y offset b1-b8. Each of the conversion programs in the list as shown in FIG. 18 calculates the converted output gradation data y in response to the input gradation data x according to the calculation equation. A plurality of the conversion programs in the list each has a different parameter for a linear equation or a different boundary value for division. That is, the γ conversion characteristics or the gradation conversion characteristics are different. In FIG. 19, the concurrent γ-conversion is shown for n+1(n=255) or the two hundred fifty-six gradation data by the global processor 38 according to the conversion program in the program RAM 36 of the SIMD-type processors 33, 53y, 53m, 53c and 53k a the IPU1, IPU3y, IPU3m, IPU3c and IPU3k. In the preferred embodiment, the gradation data is 8-bit multi-value gradation data. The global processor 38 initializes all of the processor elements PEo through PEn, and one of (n+1) or the two hundred fifty-six value gradation data Do-Dn is set in each input register of the two hundred fifty-six registers of three hundred twenty processor elements PEo through PE 255 in a step γp1.

The global processor 38 gives all of the processor elements PEo through PEn the interpolation parameters am(a8), bm(b8) for the last division i=m–8. Each processor element writes the parameters in its own parameter setting register in a step γ p2. The global processor 38 defines a computation division I as a first division i=1 in a step γp3. The boundary value xi of the division I is given to the processor elements PEo through PEn, and comparisons are instructed. The processor elements PEo through PEn each determines whether or not the gradation data Dj of Do through Dn is the ith division (i.e. xi>/=Dj). If it is, its own flag is set to one in a step γ p4. Then, the parameters A=ai and B=bi for determining the equation for the ith division are given to the processor elements PEo through PEn. The processor element with its flag having one writes its parameter setting register parameter A=ai, B=bi in a step γ p5.

Figure 21:
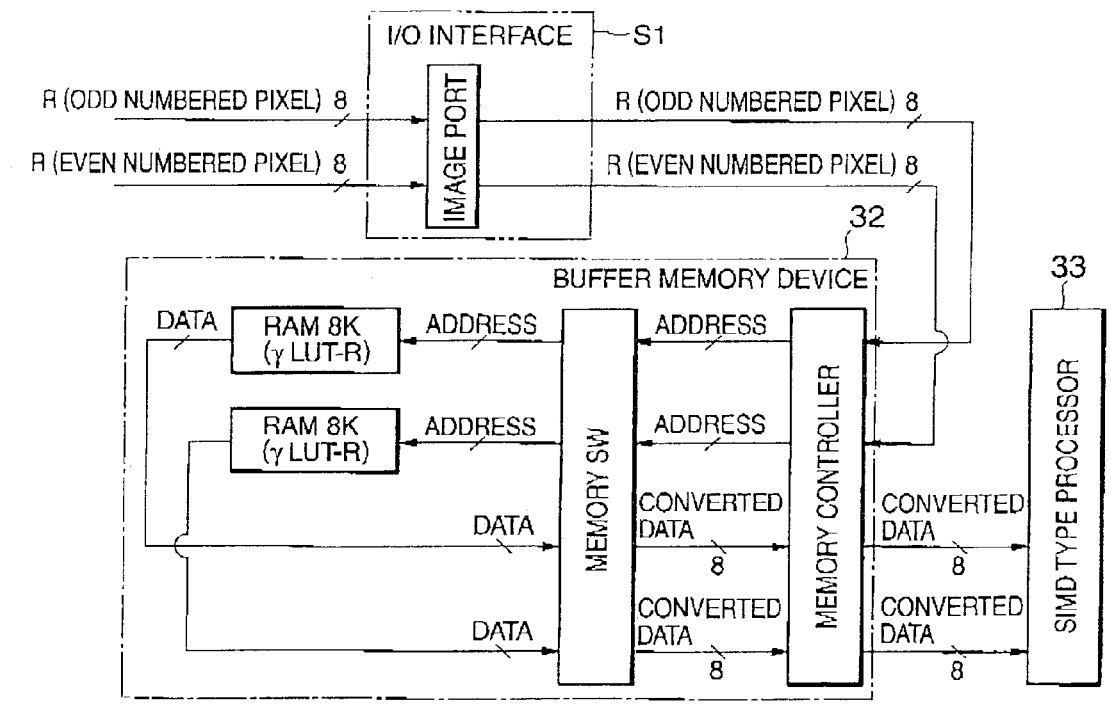
FIG. 21 is illustrating γ-conversion data flow for converting R image data.

As in the above process of making the first division for the computation, the computation division i is similarly specified in a sequential manner by incrementing I, and the process is repeated for m−1=7 or 7=i in steps γ p6, γp7, γp4, γp5 and γp6. If the flag is already 1, the corresponding processor element does not update its parameter setting register to A=ai and B=bi. After performing M−1=7 division, each of the processor elements PEo through PEn holds its parameter setting register the parameters A=ai, B=bi for the division to which its gradation data belongs. The global processor provides the processor elements PEo through PEn with computational instructions including Y=A.X+B where X is gradation data. The processor elements PEo through PE compute Y=A.X+B form A=ai and B=bi in the parameter setting registers. The data expressing the computed Y, the γ-converted gradation data is stored in its output register in a step γp8. The global processor 38 writes the output register data (AD o through AD n: the computed Y) from the output registers of the processor elements PEo through PEn in the output data area in the RAM's of the processor elements. The global processor 38 instructs to read from the memory controller specifies the read/write of the γ-converted LUT in the memory controller setting register. The above memory controller writes the γ conversion data or the γ conversion table in a step γ p9 for each value 0 through 255 gradation data in a specified area of the RAM's 0 through 17 that are specified by the setting information in the LUT. In the above interpolation computation in the above first preferred embodiment, the following is repeated for m times for i=1 through Dn for the processor elements PE, the concurrent provision of the boundary value of the ith division for the processor element group, and the concurrent provision of the interpolation parameter for the ith division as well as the computation instruction with the specified equation, as a result, the conversion of the gradation data group Do through Dn is completed. The processor element group performs the computation only once, and the conversion speed is fast. When a total of two hundred fifty-six gradation data is concurrently γ-converted using two hundred fifty-six of the three hundred twenty data processing means PE, a number of data processing steps is small in the image processing device 33. In comparison to the conventional method of repeating γ-conversion of the gradation data two hundred fifty-six times, a number of steps is substantially reduced, γ-conversion LUT is generated at a rapid pace. The above γ-conversion is modified by changing the γ-conversion characteristics of the printer γ-conversion program in the output correction program in the program RAMs 0 through 17 as written in the step p9 in FIG. 19 is written to two of the RAM's 0 through 17 so that one is used for converting the even-numbered pixel image data. FIG. 21 illustrates a γ-conversion data flow for converting R image data. The data conversion is substantially the same for the G image data and the R image data. The R image data of the adjacent pixels include the odd-numbered pixel R image data and the even-numbered pixel R image data that are concurrently outputted to a memory controller via the single image port. As shown in FIG. 21, the memory controller concurrently gives a first and second addresses respectively to the first and second RAM's as a reading address and the first and second RAM's respectively store a first and second γ LUT-R. The first and second reading addresses are respectively determined by adding the first γLUT-R write begin address and the odd-numbered pixel R image data and by adding the second γLUT-R write address and the even-numbered pixel R image data. The first γ-conversion data (the first γLUT-R data) and the second γ-conversion data (the second γ LUT-R data) are read and concurrently outputted to the SIMD-type processor 33. Instead of directly giving the memory controller the input image data from the image port, the image data is temporarily stored in the RAM's 1 through 17 and is optionally given to the memory controller. Similarly, instead of directly giving the SIMD-type processor 33 the γ-conversion data from the LUT, the γ-conversion data is temporarily stored in the RAM's 0 through 17 before outputting.

In the above first preferred embodiment, to generate the γ-conversion table as shown in FIG. 19, the boundary value is sequentially changed from the lease value and is compared to the gradation data. Optionally, the boundary value is sequentially changed from the largest value and is compared to the gradation value. For example, in the step γp2, A=a1 and B=b1 are written in the parameter setting register, and i is set to eight in the step γp3. In the step γp4, X(i−1) is given to the processor element PEo through PEn and it is determined whether or not it is the ith division or Dj≧X (i−T). In a step γp6, it is checked if i is one. If i is one, the preferred process proceeds to the step γp8. Otherwise, if it is not one, i is decremented by one-in step γp7.

Figure 22:
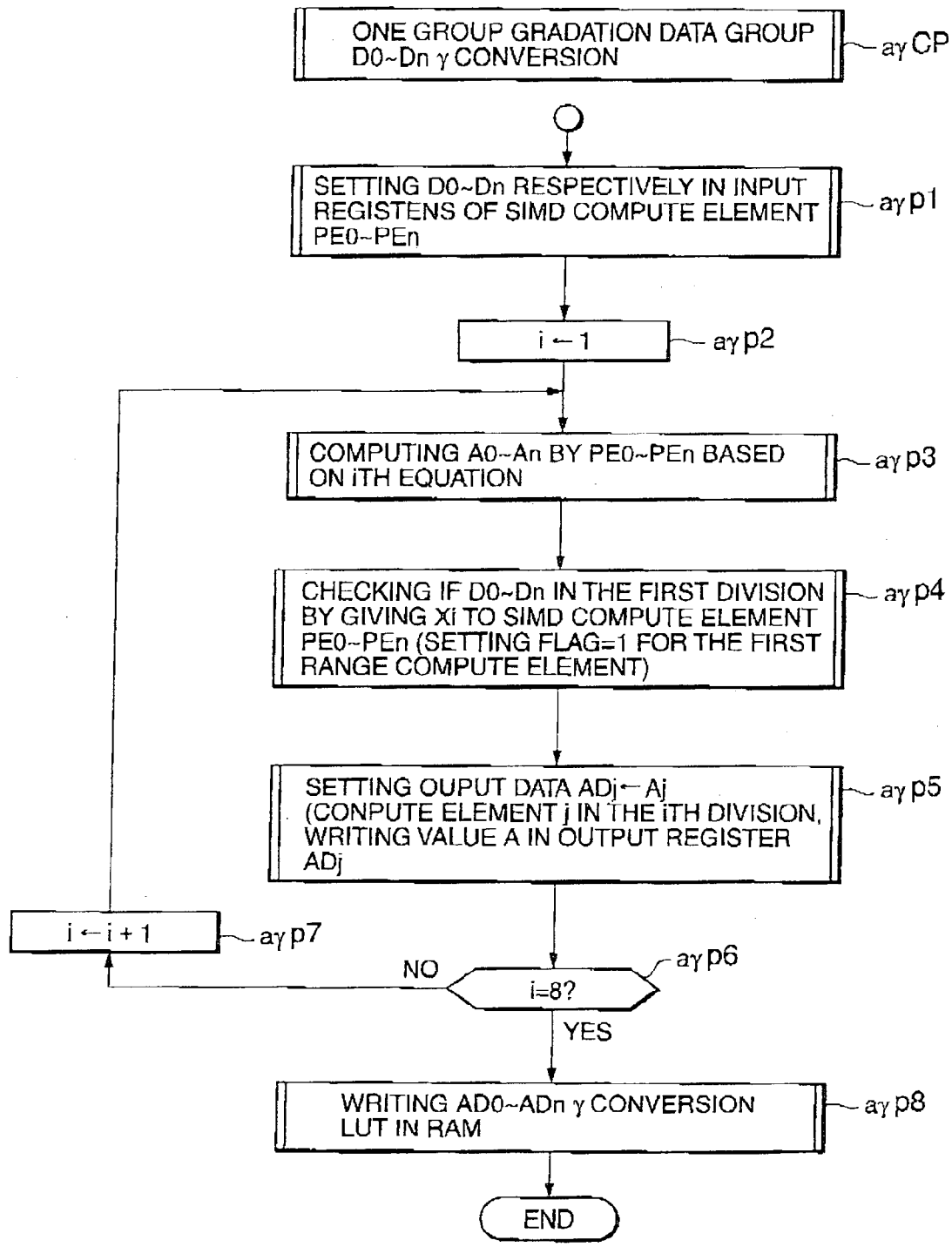
FIG. 22 is a flow chart illustrating steps involved in the second preferred process by the IPU and IPU3y, IPU3c, IPU3m and IPU3k according to the current invention.

In a second preferred embodiment, the hardware is substantially identical to that of the first preferred embodiment. On the other hand, the data process is different in the interpolation computation of the γ conversion for generating the LUT. Referring to FIG. 22, a flow chart illustrates steps involved in the second preferred process by the IPU and IPU3y, IPU3c, IPU3m and IPU3k according to the current invention. The second preferred process involves the steps of γ conversion for generating the LUT. That is, the generation of the LUT for the scanner γ conversion at the IPU3y, IPU3m, IPU3c and IPU3k. The global processor 38 of the SIMD-type processor in the second preferred embodiment initializes all of the processor elements PEo through PEn where n=255, and the gradation data Do through Dn ranging 0 to 255 is set to each of the input register of N+1 processor elements PEo through PEn in a step a γp1. The global processor 38 defines the computation division i to be the first division in a step a γp2. The interpolation parameters ai and bi in the ith division are given to all of the processor elements PEo through PEn, and it is instructed to compute yi=ai.X+bi in a step a γp3. All of the processor elements PEo through PEn compute Yi by replacing X with the gradation data Dj of Do through Dn to obtain the computed value Ao through An in a step a γp3. The global processor 38 gives the boundary value Xi of the ith division to all of the processor elements PEo through PEn for instructing to compare. The processor elements PEo through PEn each determines whether the gradation data Dj is in the ith division. That is, Xi<Dj. If it is, the flag is set to 1 in a step a γp4. A first processor element with the flag=1, the first processor element writes in the output register Adj the computed value Aj in a step a γp5. If the flag has not been set to 1 from o, the processor element does not write the computed value Aj. As processed for the first division, other ith divisions are sequentially updated for m−1 or seven divisions in steps a γp6, a γp7, a γp3, a γp4, a γp5 and a γp6. If the flag is already set to 1, the processor element does not write the computed value to the output register Aj. For the last M=8 division, the processor elements without flag=1 write the computed value Aj to the output register Adj. After m−1 or seven divisions are completed, every one of the processor elements PEo through PEn stores the computed value based upon the parameter A=ai and B=bi for the division, the global processor 38 writes the output data area in the RAM of the processor elements the computed data ADo through ADn in the output register of the processor elements PEo through PEn. This processor 38 gives the instructions for reading the memory controller specifying read/write in the γ-conversion LUT in the memory controller setting register as shown in FIG. 16A. The memory controller writes its γ-conversion data for the 0-255 gradation data in the specified area for the LUT generation in the RAM's 0 through 17 that are specified by the setting information. According to the interpolation computation in the second preferred embodiment, each processor element computes the γ-conversion data by performing the interpolation computation at the same moment. However, the gradation data to the processor elements is not identical and is not guaranteed to be in the ith division for the interpolation computation. When the gradation data that is not in the ith division is given, the computational output from the processor element is erroneous. When the gradation in the ith division is given to the processor element, the computation output is correct. All processor elements in each ith division concurrently perform the same computation, and every division is completed. During the above computation, every processor element computes a correct conversion value. This correct conversion value is used to output as valid conversion data. For one gradation data, the processor elements appear to repeat the interpolation computation m times or eight times. That is, the interpolation computation yi is performed for i=1 or m for each division. For this reason, although the computation repetitions is large, since each repletion of the computation is simple and short, the computation time for a plurality of n gradation data is also short as a whole.

A third preferred embodiment includes the substantially identical hardware as the first preferred embodiment. However, the third preferred embodiment includes a slightly different interpolation computational program for generating a γ-conversion LUT. The γ-conversion is performed by the IPU1, IPU3$y$, IPU3$m$, IPU3$c$ and IPU3$k$. Similarly, a scanner γ conversion LUT is generated for the IPU1. The reading correction program for the IPUI includes a scanner γ conversion program storage address 500 at the γ conversion LUT generation location as shown in FIG. 23. When the reading correction program is transferred from the hard disk HDD to the program RAM 36 in the SIMD-type processor 33 in the IPU1, the storage address 500 is replaced by the storage address. In addition, one set of a boundary value and parameters for the R, G, and B γ conversion such as the address 51R, 51G and 51B as shown in FIG. 23 is written at the γ conversion data storage area in the data RAM 37 of the SIMD-type processor 33. One exemplary of the boundary/parameter set includes the boundary value Xi and the parameters ai and bi for the interpolation equation yi where i=1-8 for eight division as shown in FIG. 20.

Now referring to FIG. 24, a table illustrates an exemplary set of parameter information in the data RAM 37 to be used in one preferred embodiment of the current invention. One set includes three groups for the R, G and B color component, and each group further includes addresses S1R, S1G and S1B. Even after the above set of data is written to the data RAM 37, the data is rewritten by the addresses S3R, S3G and S3B as shown in FIG. 23 in response to the operation board OPB or the host PC. Similarly, the γ conversion program storage address P00 as shown in FIG. 23 is inserted at the conversion position in each of the Y, M, C and K output correction programs for the IPU3$y$, IPU3$m$, IPU3$c$ and IPU3$c$. When the Y, M, C and K output correction programs for the IPU3$y$, IPU3$m$, IPU3$c$ and IPU3$c$ is transferred to each of the program RAMs 36 of the processors 53$y$, 53$m$, 53$c$ and 53$k$ of the IPU3$y$, IPU3$m$, IPU3$c$ and IPU3$c$, the storage address P00 of the printer γ conversion program is replaced by the actual address. In addition, one set of parameter group including the boundary value and the parameter for the γ conversion such address data P1Y, P1M, P1C and P1K as shown in FIG. 23 is written in the γ conversion data area in each of the data RAM of the SIMD-type processors 53$y$, 53$m$, 53$c$ and 53$k$. Even after the above data is written, the data is rewritten by the addresses S3R, S3G and S3B as shown in FIG. 23 in response to the operation board OPB or the host PC. Although most steps involved in the γ conversion process in the third preferred embodiment are substantially identical to those of the first preferred embodiment, in the preferred embodiment, the boundary value xi and parameters ai, bi are read from the data RAMs 37 of the SIMD-type processor 33 and are outputted to the processor element PE.

One alternative embodiment involving the above described interpolation is based upon a conversion equation specifying a Bezier curve rather than a liner approximation equation. The alternative embodiment generates a conversion table by computing the converted data that corresponds to multi-value data for a gradation that is expressed by a plurality of bits. For example, as disclosed in Japanese Patent 3112751, using an extended three-dimensional Bezier curve, assuming that one-byte gradation data has a beginning point 0 and an ending point 255, an incline c and a parameter d, an equation is expressed as follows:

$$y = cx(255-x)^2 + (3 \times 255 - d)(255-x)x^2 + x^3$$

Where y is converted data or output data and x is unconverted data or input data, y is computed for each value of x that ranges from 0 to 255. A conversion table is generated by using x as an address and y as data to be stored. Based upon the alternative embodiment, A fourth preferred embodiment has a substantially identical hardware components as the first preferred embodiment. The fourth preferred embodiment does not perform the interpolation computation by a conversion table, but uses a conversion table that is stored in a hard disk HDD. The read correction program for IPU1 includes the storage address S00 as shown in FIG. 25 for the scanner γ conversion program at the γ conversion LUT generation location. When the reading correction program is transferred to the program RAM 36 for the SIMD-type processor 33 of the IPU 1 from the hard disk HDD, the address S00 of the scanner γ-conversion program address is transferred by replacing the storage address of the reading correction program. In addition, one set of the R, G and B γ-conversion tables such as conversion tables for S1R, S1G and S1B as shown in FIG. 25 are transferred and written to a γ-conversion table storage area in the data RAM 37 of the SIMD-type processor 33. In case of the γ-conversion of the RGB image data, the SIMD-type processor 33 reads the γ-conversion table from the data RAM 37 and writes the same γ-conversion table in the two of the RAMs 0 through 17 so that the odd-numbered pixel image data and even-numbered pixel image data on the same line are concurrently γ-converted as shown in FIG. 21. More concretely, assuming the LUT generation by writing the LUT data in the RAMs 36 and 37 or control information memory CM of FIG. 8 of the SIMD-type processor 33 to one of the eighteen RAMs 0 through 17 such as the RAM 6 at an address A (A+255), the following setting information and the management information from the RAMs 36 and 37 or control information memory CM includes:

Setting information

Transfer Mode:    the above (TM4)
From:    the RAMs 36 and 37 or control information memory CM

| | |
|---|---|
| To: | RAM 6 |
| Control Mode: | the above (CM1) |
| Management Information | |
| Beginning Address: | A |
| Ending Address: | A+255 |
| USE Mode: | LUT (write) |

Based upon the above information, the memory controller 6 sets a data selector in the memory switch SW2 the "data write" from the memory controller to the RAM 6 and writes the LUT data in the RAMs 36 or 37 from the beginning address A to the ending address A+255 in the RAM 6. Since other settings and controls for the γ-conversion are substantially identical to those in the first preferred embodiment, the description will not be repeated. Even after the above γ-conversion tables for the R, G and B color image data at the addresses S1R, S1G and S1B is written the RAM 37, the above data is rewritten by the addresses S3R, S3G and S3B as shown in FIG. 25 in response to the operation board OPB or the host PC. Similarly, the γ conversion program storage address P00 as shown in FIG. 23 is inserted at the conversion position in each of the Y, M, C and K output correction programs for the IPU3y, IPU3m, IPU3c and IPU3c. When the Y, M, C and K output correction programs for the IPU3y, IPU3m, IPU3c and IPU3c is transferred to each of the program RAMs 36 of the processors 53y, 53m, 53c and 53k of the IPU3y, IPU3m, IPU3c and IPU3c, the storage address P00 of the printer γ conversion program is replaced by the actual address. In addition, one set of parameter group including the boundary value and the parameter for the γ conversion such address data P1Y, P1M, P1C and P1K as shown in FIG. 25 is written in the γ conversion data area in each of the data RAM of the SIMD-type processors 53y, 53m, 53c and 53k. Even after the above data is written, the data is rewritten by the addresses PSY, P3M, P3C and P3K as shown in FIG. 25 in response to the operation board OPB or the host PC.

In any one of the above described four preferred embodiments, a set of four SIMD-type processors 53y, 53m, 53c and 53k concurrently processes the four color components of the YMCK image data. In another preferred embodiment, a single SIMD-type processor sequentially process the color components for the printer γ-conversion of the YMCK image data or the output process as a whole. The above single processor scheme is appropriate for one-drum printers in which a single photosensitive drum unit sequentially forms an image for each color component. However, in color printers in which a set of the four photosensitive drum units is arranged in a tandem manner, a set of four SIMD-type processors 53y, 53m, 53c and 53k concurrently is highly desirable for a high-speed printer for processing the four color components of the YMCK image data in order to substantially increase the total processing speed.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A data conversion apparatus, comprising:
a data processing unit for processing a predetermined number of pieces of data in parallel, each of the data having a predetermined number of bits;
a buffer memory unit connected to said data processing unit having memory areas for storing the data from an external of the data conversion apparatus and for inputting the stored data in the predetermined number of the bits and the pieces to said data processing unit in parallel;
a control information memory unit for storing control information data specifying non-buffer functions and use areas of said memory areas in said buffer memory unit; and
a buffer controller unit connected to said data processing unit, said buffer memory unit and said control information memory unit for defining the use areas for the non-buffer functions in said buffer memory unit based upon the control information data and for establishing a data transfer line between said buffer memory unit and said data processing unit so that each of the use areas of the non-buffer functions has parallel inputs from and outputs to said data processing unit.

2. The data conversion apparatus according to claim 1 wherein said data processing unit has a predetermined number of sub-processing units, the control information data in said control information memory unit specifying the non-buffer functions and the use areas for each of said sub-processing units.

3. The data conversion apparatus according to claim 2 wherein said buffer controller unit further includes a plurality of memory controllers for each specifying a memory area in said buffer memory unit for reading and writing, said buffer controller unit separately setting in each of said memory controllers a corresponding one of the control information data for one of said sub-processing units.

4. The data conversion apparatus according to claim 1 wherein said control information memory unit further includes a data memory area where the control information data is written by said buffer controller and the data is read by said data processing unit.

5. The data conversion apparatus according to claim 1 wherein said control information memory unit further includes a program memory area where a program for controlling said buffer controller unit is stored.

6. The data conversion apparatus according to claim 1 wherein the control information data specifies a beginning address and an ending address of each of the use areas for the non-buffer functions.

7. The data conversion apparatus according to claim 6 wherein the control information data further includes characteristic data indicative of each of the use areas for the non-buffer function or a buffer function.

8. The data conversion apparatus according to claim 1 wherein each of the use areas for the non-buffer functions is a look-up table.

9. The data conversion apparatus according to claim 1 wherein said control information memory unit stores conversion data for generating a conversion table in said buffer memory unit, said buffer controller unit generating in said buffer memory unit a plurality of the conversion tables based upon the control information data and the conversion data, each of the conversion tables being associated with a plurality of pre-conversion data, corresponding post-conversion data is being read from the conversion tables in parallel.

10. The data conversion apparatus according to claim 9 wherein the conversion data in said control information memory unit includes a software program for generating the conversion table, said data processing unit further including a plurality of sub-data processing units for concurrently processing the data, said data processing unit generating the conversion table based upon the software program using the plurality of the said sub-data processing units, said buffer controller unit generating in said buffer memory unit the same plurality of the conversion tables that said data processing unit has generated.

11. The data conversion apparatus according to claim 10 wherein the software program performs interpolation based upon boundary values dividing the input gradation range of conversion characteristics into a plurality of divisions, parameters for linearly approximating the conversion characteristics in each of the divisions and multiple value multi-bit gradation data for expressing gradation levels, the post-conversion data being determined by associating the multiple value multi-bit gradation data for the gradation levels.

12. The data conversion apparatus according to claim 9 wherein the conversion data in said control information memory unit includes the conversion table, said buffer controller unit generating in said buffer memory unit a plurality of the conversion tables that is the same as the one in said control information memory unit.

13. The data conversion apparatus according to claim 12 wherein the two same conversion tables are generated in said buffer memory unit, said buffer controller unit corresponding one line of odd-numbered image pixel data to one of the two conversion tables and another line of even-numbered image pixel data to the other of the two conversion tables, said buffer controller unit concurrently reading the post-conversion data for each of the image pixel data from the conversion tables.

14. The data conversion apparatus according to claim 13 wherein the pre-conversion data is the image data, the conversion tables being a γ-conversion table.

15. An image processing apparatus comprising:
an image scanning unit for scanning a document and generating image data;
a data processing unit for processing a predetermined number of pieces of the image data in parallel, each of the image data having a predetermined number of bits;
a buffer memory unit connected to said data processing unit having memory areas and said image scanning unit for storing the image data from said image scanning unit and for inputting the stored image data in the predetermined number of the bits and the pieces to said data processing unit in parallel;
a control information memory unit for storing control information data specifying non-buffer functions and use areas of said memory areas in said buffer memory unit;
a buffer controller unit connected to said data processing unit, said buffer memory unit and said control information memory unit for defining the use areas for the non-buffer functions in said buffer memory unit based upon the control information data and for establishing a data transfer line between said buffer memory unit and said data processing unit so that each of the use areas of the non-buffer functions has parallel inputs from and outputs to said data processing unit; and
an image forming unit connected to said buffer controller and said buffer memory unit for forming an image based upon the image data.

16. The image processing apparatus according to claim 15 wherein said image scanning unit further comprises a first image processing unit for correcting RGB image data and a second image processing unit for converting the corrected RGB image data into YMCK image data, said image forming unit further comprises a third image processing unit for correcting the YMCK image data for outputting, said first image processing unit including a first data conversion unit for generating a plurality of first conversion tables for components of the RGB image data, said third processing unit including a second data conversion unit for generating a plurality of second conversion tables for components of the YMCK image data.

17. The image processing apparatus according to claim 16 wherein said image forming unit has a corresponding number of said third image processing units for a number of photosensitive units.

18. The image processor apparatus according to claim 17 wherein said second data conversion unit in said third image processing unit includes sub-data processing units for handling a plurality of matrixes for a dithering process.

19. The image processor apparatus according to claim 16 further comprising:
a parallel bus for transferring the image data;
an image memory unit for storing the image data;
an image memory control connected to said parallel bus and said image memory unit for reading the image data from said image memory unit to said parallel bus and for writing the image data on the parallel bus to said image memory unit; and
an image data control unit connected to said image scanning unit, said second image processing unit and said parallel bus for controlling the data among said image scanning unit, said second image processing unit and said parallel bus.

20. The image processor apparatus according to claim 19 wherein said data control unit compresses the image data from said image scanning unit and outputs the compressed image data to said parallel bus.

21. The image processor apparatus according to claim 19 wherein said data control unit outputs the image data to said second image processing unit for processing and compresses the processed image to output to said parallel bus.

22. The image processor apparatus according to claim 19 wherein said data control unit decompresses the compressed image data from said parallel bus to output to said second image processing unit.

23. The image processor apparatus according to any one of claims 20, 21 and 22 wherein said memory control unit compresses the image data, writes the compressed image data to said image memory unit, and reads the compressed image data to decompress the compressed image data.

24. The image processor apparatus according to claim 23 wherein the image data to be compressed comes from an external device including a personal computer, a LAN, a facsimile and said image data control unit.

* * * * *